United States Patent [19]
Hart

[11] 4,106,819
[45] Aug. 15, 1978

[54] EMERGENCY PORTION FOR A BRAKE CONTROL VALVE

[75] Inventor: James E. Hart, Trafford, Pa.

[73] Assignee: Westinghouse Air Brake Company, Wilmerding, Pa.

[21] Appl. No.: 825,748

[22] Filed: Aug. 18, 1977

[51] Int. Cl.[2] .................... B60T 15/32; B60T 15/42
[52] U.S. Cl. ....................................... 303/38; 303/82
[58] Field of Search .................... 303/35–39, 303/69, 80–83

[56] References Cited

U.S. PATENT DOCUMENTS

| | | | |
|---|---|---|---|
| 2,106,491 | 1/1938 | Sexton | 303/46 |
| 3,018,138 | 1/1962 | Wilson et al. | 303/36 |
| 3,160,447 | 12/1964 | McClure et al. | 303/83 |
| 3,175,871 | 3/1965 | Wilson | 303/82 |
| 3,208,801 | 9/1965 | McClure | 303/36 |
| 3,232,678 | 2/1966 | Wilson | 303/80 |
| 3,240,540 | 3/1966 | McClure | 303/83 |
| 3,716,276 | 2/1973 | Wilson et al. | 303/82 |

*Primary Examiner*—Duane A. Reger
*Attorney, Agent, or Firm*—W. F. Poore; R. W. McIntire, Jr.

[57] ABSTRACT

An inexpensive emergency valve device embodies a cycling-type continual quick service valve operative by an abutment, subject on its respective opposite sides to the pressure in a train brake pipe and in a quick action chamber, in response to a service rate of reduction of the pressure of the fluid in a train brake pipe to repeatedly vent and supply fluid under pressure from and to a quick service volume disposed on one side of a diaphragm-type valve that is operatively responsive to the venting of fluid under pressure from this volume to effect the release of fluid under pressure from the quick action chamber to atmosphere at a rate faster than a service rate to cause joint cyclic operation of the continual quick service valve and the diaphragm valve to successively supply fluid under pressure from the brake pipe to and thereafter release fluid under pressure from the quick service volume at a certain rate and from the quick action chamber at a faster rate so long as fluid under pressure is released from the train brake pipe at a service rate. An emergency piston disposed within the quick service volume cooperates with the diaphragm valve in response to an emergency rate of reduction of the pressure in the brake pipe to effect operation of a brake pipe vent valve and a poppet-type valve that effects the supply of fluid under pressure from an emergency reservoir to a brake cylinder jointly with the supply from an auxiliary reservoir to cause an emergency brake application.

36 Claims, 7 Drawing Figures

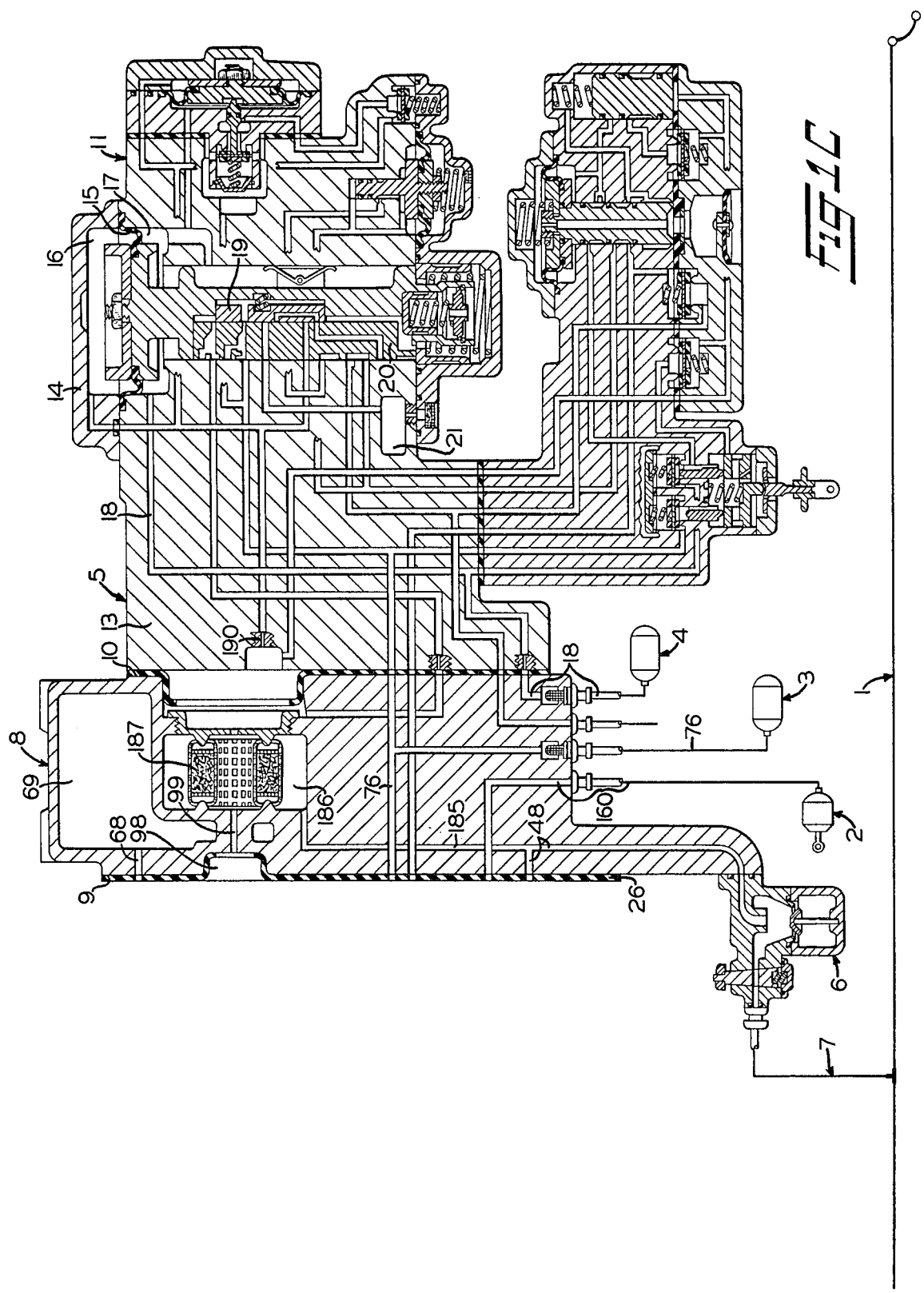

EMERGENCY PORTION FOR A BRAKE CONTROL VALVE

BACKGROUND OF THE INVENTION

In U.S. Pat. No. 3,232,678, issued Feb. 1, 1966 to William G. Wilson, and assigned to the assignee of the present application, there is shown and described a brake control valve device that is substantially the same in function and operation as the brake control valve device included in the standard fluid pressure brake apparatus now in use on railway freight cars owned and operated by American railroads. The brake control valve device shown in the above-mentioned U.S. Pat. No. 3,232,678 comprises a service valve portion embodying therein a plurality of slide, spool and disc type valves, and an emergency valve portion that has a slide-type emergency valve slidable on a flat ported valve seat and a graduating valve slidably mounted on a flat ported surface provided therefor on the side of the emergency slide valve opposite the side thereof that engages the flat ported valve seat. This emergency valve portion is operative in response to a service rate of reduction of pressure in a train brake pipe to release fluid under pressure from a quick action chamber to atmosphere at a service rate thereby rendering this emergency valve portion effective to cause an emergency brake application only in response to an emergency rate of reduction of pressure in the train brake pipe.

The manufacture and production of these slide-type valves and valve seats of this emergency valve portion require considerable accurate and skillful machining which, as is readily apparent, increases the cost of the emergency valve portion of which they are an essential component.

Moreover, in U.S. Pat. No. 3,716,276, issued Feb. 13, 1973 to Richard L. Wilson et al, and assigned to the assignee of the present application, there is shown and described a brake control valve device that is substantially the same in function and operation as the latest design of brake control valve devices now being offered to the railway industry as the brake control valve device included in the standard fluid pressure brake apparatus installed on any new freight cars built subsequent to Jan. 1, 1977. In this brake control valve device, the fluid under pressure released from the quick action chamber, when effecting a service brake application, is used to operate a continual quick service valve device that effects a "quick service" transmission through a train brake pipe of a pressure reduction wave.

The above-mentioned continual quick service valve device operates repeatedly in cycles to release locally on each railway vehicle provided with this valve device fluid under pressure from the brake pipe to atmosphere so long as a relay valve device embodied in a brake valve device on the locomotive effects a release of fluid under pressure from the train brake pipe to atmosphere via a choke at a normal rate of brake pipe pressure reduction.

However, if the rate of release of fluid under pressure from the train brake pipe exceeds a normal service rate and approaches, but is less than, an emergency rate, this continual quick service valve device is ineffective to operate in repeated cycles for the reasons given below.

The emergency slide valve and the emergency graduating valve, which are operated by an abutment subject on one side to the pressure in the brake pipe and on the other side to the pressure in the quick action chamber, are so constructed as to release fluid under pressure from the quick action chamber at the same rate as fluid under pressure is released from the train brake pipe.

Consequently, when the rate of release of fluid under pressure from the train brake pipe is greater than the normal rate but less than an emergency rate, the quantity or amount of fluid under pressure supplied from the quick action chamber to the continual quick service valve device via the emergency graduating valve for operating this continual quick service valve device is correspondingly increased. This increased amount of fluid under pressure is supplied through the pipe 13, passageway 115 and bore 120 to the lower side of the diaphragm 77 shown in FIG. 3 of the above-mentioned U.S. Pat. No. 3,716,276 to deflect this diaphragm upward to unseat it from the annular valve seat 119. It is apparent from FIG. 3 that upon the unseating of this diaphragm 77 from the valve seat 119, fluid under pressure flows from the bore 120 into the chamber 125 below the diaphragm 77 and thence to atmosphere via the passageway 122 and choke 123 at a rate determined by the size of this choke which in the brake control valve device now being sold for installation on freight cars used by American railroads has an actual diameter of 0.015625 inch. This being a choke of small size, it so restricts the flow of fluid under pressure from the chamber 125 shown in FIG. 3 that, upon an excessive supply of fluid under pressure to this chamber 125, the continual quick service valve device becomes inoperative to operate in cycles to locally release fluid under pressure from the train brake pipe to atmosphere so long as fluid under pressure is being released from the train brake pipe by the relay valve device embodied in the brake valve device on the locomotive.

Furthermore, it is apparent that when this continual quick service valve device operates in repeated cycles in response to a normal rate of brake pipe reduction, this cyclic operation produces excessive wear of the various elements, especially the valves and valve seats, of this valve device which wear, of course, is undesirable.

Accordingly, it is the general purpose of this invention to provide a railway car brake control valve device with a novel emergency valve portion that embodies a first movable abutment, subject on its respective opposite sides to the pressure in a train brake pipe and in a quick action chamber that is effective, upon a normal service rate of reduction of the pressure in the train brake pipe, to unseat a poppet-type valve from one of two coaxial spaced-apart valve seats between which it is so disposed that, while unseated from both seats, fluid under pressure is released from a quick service volume previously charged from the train brake pipe and disposed on one side of a diaphragm-type valve that is operatively responsive to the venting of fluid under pressure from this quick service volume to effect the release of fluid under pressure from the quick action chamber and the chamber on one side of the first abutment to atmosphere at a rate faster than a normal service rate to cause joint cyclic operation of the abutment-operated poppet valve and the diaphragm-type valve to successively release fluid under pressure from the quick service volume at a certain rate and from the quick action chamber at a faster rate and thereafter recharge this quick service volume from the brake pipe so long as fluid under pressure is released from the train brake pipe at a normal service rate.

An emergency piston disposed within the quick service volume cooperates with the diaphragm valve in response to an emergency rate of reduction of the pressure in the train brake pipe to effect operation of a second movable abutment that constitutes a brake pipe vent valve and a poppet-type valve which effects the supply of fluid under pressure from an emergency reservoir to a brake cylinder simultaneously with the supply from an auxiliary reservoir by operation of the service portion of the control valve device to cause an emergency brake application.

SUMMARY OF THE INVENTION

According to the present invention, a railway freight car brake control valve device that includes a service valve portion and a pipe bracket that are substantially the same as the service valve portion and pipe bracket shown in the above-mentioned U.S. Pat. No. 3,232,678, and a novel emergency valve portion which is secured to this pipe bracket whereby there is provided a brake control valve device, the novel emergency portion of which embodies therein a cycling-type continual quick service valve device having a hollow poppet-type valve operated sequentially by a first movable abutment, subject on its respective opposite sides to the pressure in a train brake pipe and in a quick action chamber, between a first position, in which it is seated on one of two coaxial spaced-apart valve seats and a quick service volume is charged from a train brake pipe via the hollow poppet valve, and a second position in which it is unseated from both valve seats and fluid under pressure is vented from the quick service volume to atmosphere at a certain rate.

This novel emergency portion further comprises a diaphragm-type valve on one side of which is disposed the quick service volume the opposite side being normally pressed against an annular valve seat by fluid under pressure in the quick service volume to close communication between the quick action chamber and atmosphere via the other one of the two spaced-apart valve seats while the poppet-type valve is unseated therefrom.

Furthermore, this emergency portion also embodies an emergency piston disposed within the quick service volume on the one side of the diaphragm valve. When an emergency rate of brake pipe reduction is effected, a sufficient differential fluid pressure force is developed on the first movable abutment to cause it to shift the poppet-type valve into engagement with the other one of the two spaced-apart valve seats to limit the rate of flow of fluid under pressure from the quick action chamber to atmosphere via a choke of a chosen size thus enabling the fluid under pressure in the quick action chamber to establish, on the diaphragm valve, a fluid pressure force of sufficient magnitude that, when transmitted to the emergency piston, enables this piston to effect the release of fluid under pressure from the second abutment whereupon it is unseated from a vent valve seat to release fluid under pressure from the train brake pipe at an emergency rate.

Furthermore, this emergency piston at the same time unseats a poppet-type valve from its seat to effect the supply of fluid under pressure from an emergency reservoir to a brake cylinder simultaneously with the supply to this cylinder from an auxiliary reservoir by operation of the service portion of this brake control valve device whereby fluid under pressure from the two reservoirs establish a higher pressure in the brake cylinder than obtained therein when a service brake application is effected.

In the accompanying drawings:

FIGS. 1A, 1B and 1C, when taken together such that the lower edge of FIG. 1A is matched with the upper edge of FIG. 1B and the right-hand edge of FIG. 1B is matched with the left-hand edge of FIG. 1C, constitute a diagrammatic view, in section, of an improved brake control valve device embodying the invention.

Figure 1A:
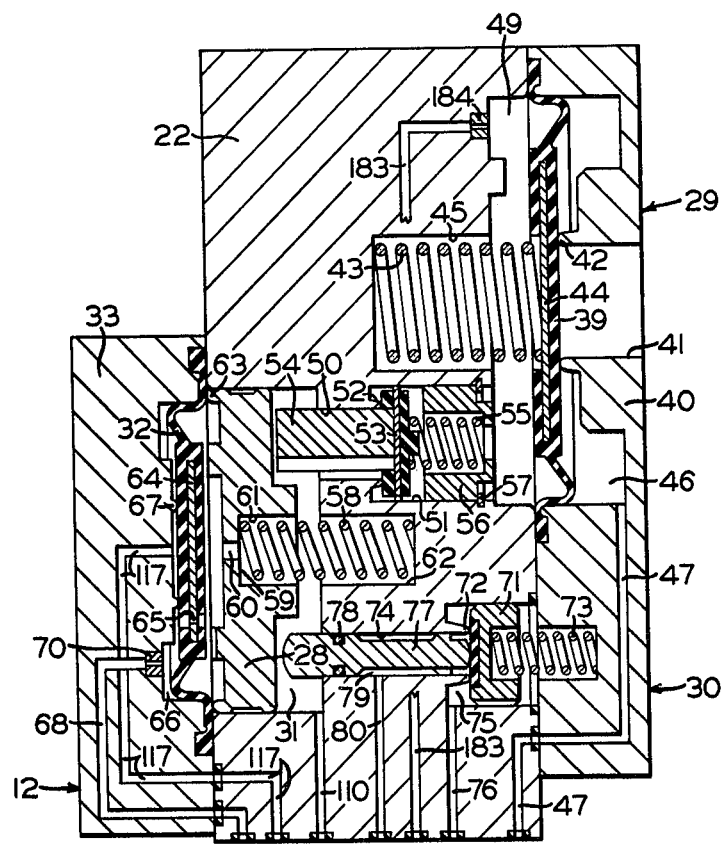
Figure 1B:
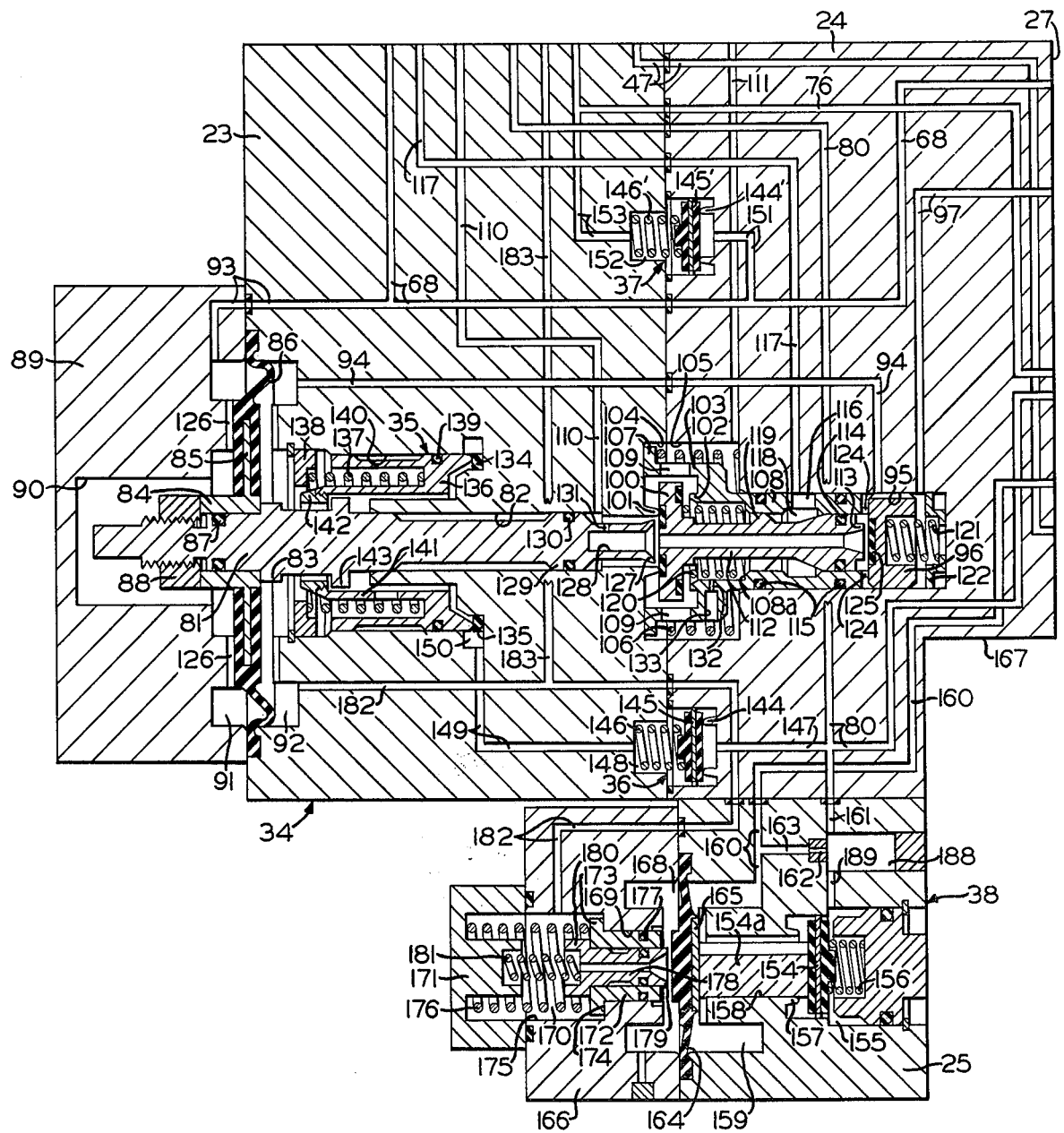
Figure 1D:
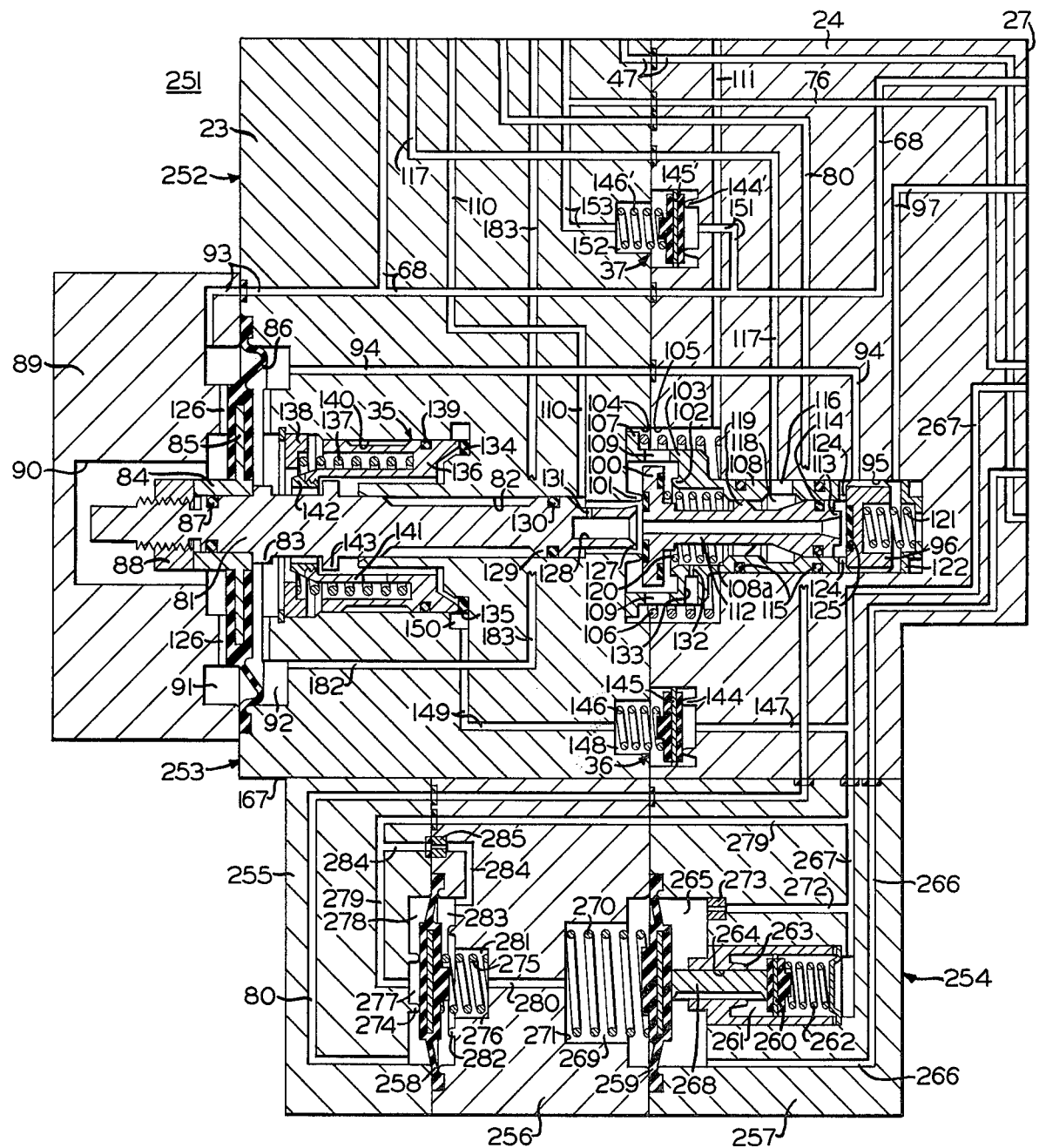
Figure 3:
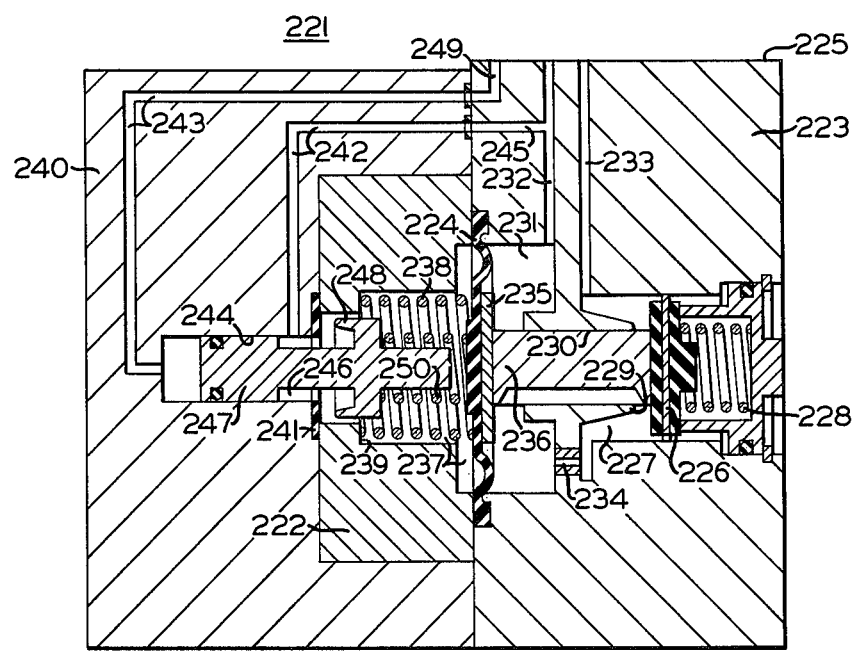
FIG. 3 is a diagrammatic view, in section, of an inshot valve device that may be used in place of the inshot valve device shown in FIG. 1B.

FIGS. 1A, 1D and 1C, when taken together such that the lower edge of FIG. 1A is matched with the upper edge of FIG. 1D and the right-hand edge of FIG. 1D is matched with the left-hand edge of FIG. 1C, constitute a diagrammatic view in section, of an improved brake control valve device that embodies an inshot valve device that is somewhat different in construction and operation than the inshot valve devices shown in FIGS. 1B and 3.

Figure 1E:
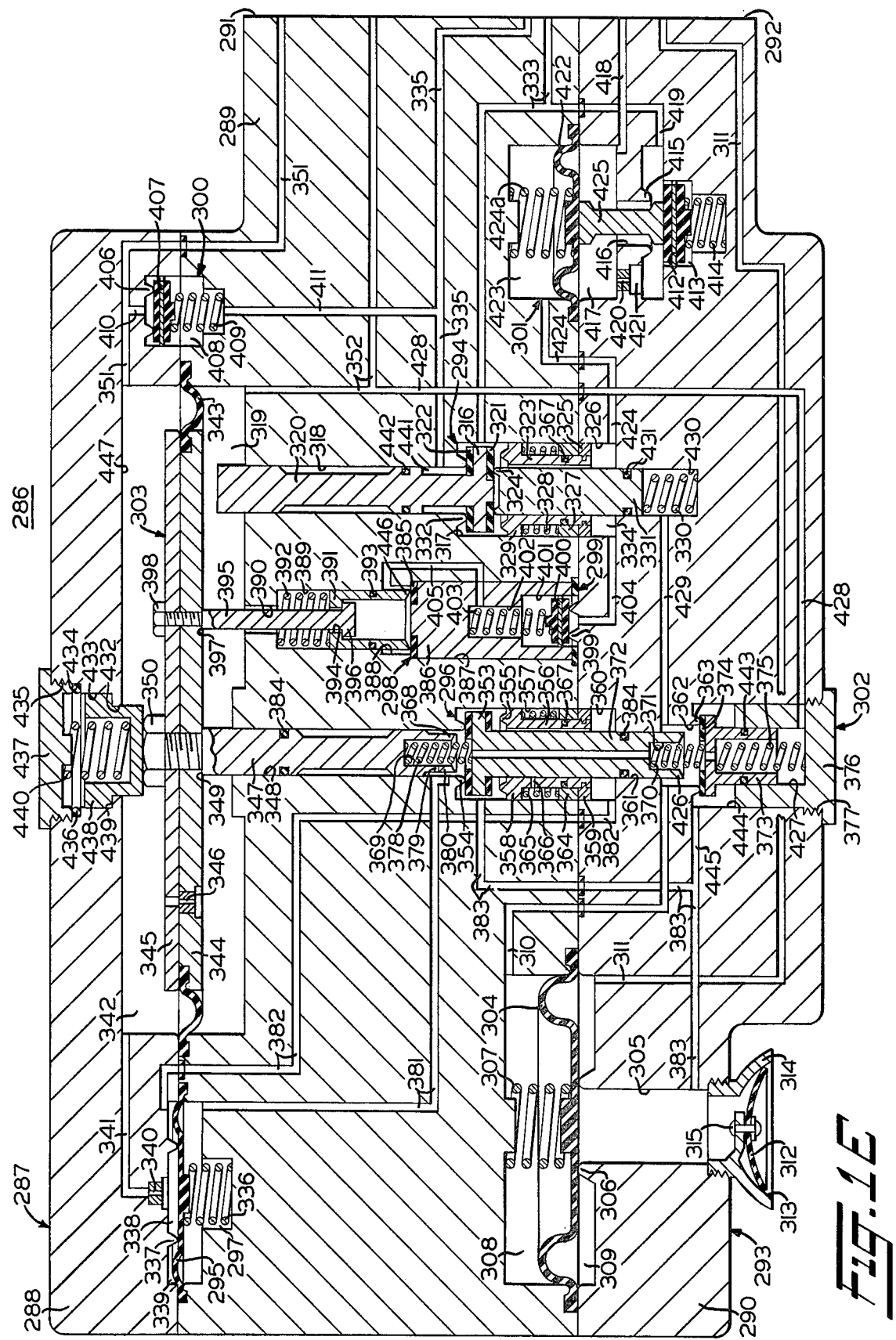

FIGS. 1E and 1C when taken together such that the right-hand edge of FIG. 1E is matched with the left-hand edge of FIG. 1C, constitute a diagrammatic view in section, of an improved brake control valve device constructed in accordance with a fifth embodiment of the invention.

DESCRIPTION - FIGS. 1A, 1B and 1C

As shown in FIGS. 1A, 1B and 1C of the drawings, when the lower edge of FIG. 1A is placed above the upper edge of FIG. 1B and the right-hand edge of FIG. 1B is placed along the side of the left-hand side of FIG. 1C, an improved freight car fluid-pressure-operated brake apparatus constituting a first embodiment of the invention comprises a brake pipe 1 that extends from one end of the car to the other, a brake cylinder 2, an emergency or supplemental reservoir 3, an auxiliary reservoir 4, and a brake control valve device 5 connected to the brake pipe 1 through a combined cut-out cock and centrifugal dirt collector 6 and a branch pipe 7.

The brake control valve device 5 may comprise a pipe bracket 8 having gasket faces 9 and 10 disposed opposite each other, a service or triple valve device or portion 11 and a novel emergency valve device or portion 12.

The service valve portion 11 and pipe bracket 8 shown in FIG. 1C of the drawings may be substantially the same in construction and operation as the service valve portion 7 and pipe bracket 6 shown and described in the above-mentioned U.S. Pat. No. 3,232,678. Since reference may be had to this patent for a complete description of the structure and operation of this service valve portion and pipe bracket, it is deemed unnecessary to describe them in detail herein. Briefly, however, the service valve portion 11 comprises a sectionalized casing 13 between which and a cover member 14, secured thereto by any suitable means (not shown), is clamped the outer periphery of a diaphragm 15 subject opposingly on its opposite sides to brake pipe pressure in a chamber 16 at the upper side of this diaphragm and to the pressure in the auxiliary reservoir 4 connected to a chamber 17 at the lower side of this diaphragm by a pipe and correspondingly numbered passageway 18 that extends through the pipe bracket 8 and the sectionalized casing 13. Operatively connected to the diaphragm 15 is a service graduating valve 19 and a service slide valve 20 for respectively controlling the release of fluid under pressure from the brake pipe 1 to a quick service volume 21 and the supply of fluid under pressure from the auxiliary reservoir 4 to the brake cylinder 2 in response to variations in brake pipe pressure, as disclosed in the above-mentioned U.S. Pat. No. 3,232,7678.

The novel emergency valve portion 12 shown in FIGS. 1A and 1B of the drawings, when the lower edge of FIG. 1A is placed above the upper edge of FIG. 1B, has a sectionalized casing comprising an upper casing section 22, a pair of center casing sections 23 and 24 and a lower casing section 25. The upper casing section 22 is secured to the upper end of the left-hand center casing section 23 by any suitable means (not shown) and the right-hand center casing section 24 is disposed between the right-hand side of the casing section 23 and the gasket face 9 (FIG. 1C) on the left-hand side of the pipe bracket 8 it being noted that these casing sections 23 and 24 (FIG. 1B) are secured to the pipe bracket 8 (FIG. 1C) by any suitable means (not shown) and that a ported gasket 26 is disposed between the gasket face 9 and a gasket face 27 formed on the right-hand side of the center casing section 24. Likewise, the upper end of the lower casing section 25 is secured to the lower end of the right-hand center casing section 24 by any suitable means (not shown).

As shown in FIGS. 1A and 1B of the drawings, the emergency valve portion 12 comprises an emergency piston 28, an emergency brake pipe vent valve device 29, and a high pressure valve device 30 operated by the emergency piston 28 that is disposed in a quick service volume chamber 31 which is formed by the cooperative relationship of the upper casing section 22 and a diaphragm-type quick action chamber breather valve 32 the outer periphery of which is clamped between the left-hand side of this upper casing section 22 and a first cover member 33 that is secured to this casing section 22 by any suitable means (not shown).

As is shown in FIG. 1B, the emergency valve portion 12 further comprises a continual quick service valve device 34 for controling in cycles the flow of fluid under pressure from the brake pipe 1 to the quick service volume chamber 31 (FIG. 1A) and the subsequent release of this fluid under pressure from this chamber 31 to atmosphere, an emergency accelerated release valve mechanism 35 that is so embodied in the continual quick service valve device 34 as to connect the brake cylinder 2 and the auxiliary reservoir 4 to the brake pipe 1 when effecting a brake release subsequent to an emergency brake application, an emergency accelerated release check valve device 36, a spill over check valve device 37 and an inshot valve device 38.

The emergency brake pipe vent valve device 29 comprises an annular diaphragm 39, the outer periphery of which is clamped between the right-hand side of the upper casing section 22 and a second cover member 40 that is secured to the casing section 22 by any suitable means (not shown). Extending through the cover member 40 is a bore 41 of large diameter that has an annular valve seat 42 formed at its left-hand end against which the diaphragm 39 is normally biased by a spring 43 that is interposed between a plate 44 to which the diaphragm 39 is bonded and the bottom of a bottomed bore 45 provided in the casing section 22. The diaphragm 39 and cover member 40 cooperate to form a chamber 46 into which opens one end of a passageway 47 that extends through the cover member 40 and the casing sections 22, 23 and 24 to the gasket face 27 on the casing section 24 where it registers with a port in the ported gasket 26 (FIG. 1C). This port in the gasket 26 establishes a communication between the passageway 47 in the casing section 24 and a passageway 48 in the pipe bracket 8 to which fluid under pressure is supplied from the brake pipe 1 through the branch pipe 7 and the combined cut-out cock and dirt collector 6. Accordingly, it is apparent that fluid under pressure is supplied from the brake pipe 1 to the passageway 47 and thence to the chamber 46.

As shown in FIG. 1A, the diaphragm 39 and the casing section 22 cooperate to form on the left-hand side of this diaphragm 39 a chamber 49 to which fluid under pressure is supplied from the brake pipe 1 in a manner hereinafter described.

As is also shown in FIG. 1A, the casing section 22 is provided with a bore 50 and a coaxial counterbore 51. An annular valve seat 52 is provided at that end of the bore 50 that opens into the counterbore 51. The other end of the bore 50 opens into the quick service volume chamber 31 and the other end of the counterbore 51 opens into the chamber 49.

In order to effect the release of fluid under pressure from the chamber 49 to the chamber 31 and thence to atmosphere in a manner hereinafter described, a flat disc valve 53 having a fluted stem 54 extending through the bore 50 into the chamber 31 is normally biased against the valve seat 52 by a spring 55 interposed between the disc valve 53 and a hollow cylindrical spring seat 56 disposed in the counterbore 51 and retained therein by a snap ring 57 that is inserted in an annular groove provided therefor in the wall surface of the counterbore 51.

A spring 58 interposed between a shoulder 59 formed between one end of a bore 60 and a coaxial counterbore 61 provided in the emergency piston 28 and the end of a bottomed bore 62 provided in the casing section 22 normally biases an annular bead 63 on the left-hand face of the piston 28 against the right-hand side of the diaphragm-type valve 31 so that the right-hand face of this piston 28 is disposed a short distance from the end of the fluted stem 54.

As shown in FIG. 1A, the diaphragm-type breather valve 32 is constructed of some suitable resilient material, such as, for example, rubber, that is bonded to a plate 64 that is provided with a quick action chamber charging choke 65 that restricts the flow of fluid under pressure from the quick service volume chamber 31 and, therefore, the brake pipe 1, to a chamber 66 disposed about the outside of an annular valve seat 67 formed on the first cover member 33 against which valve seat 67 the diaphragm-type breather valve 32 is normally biased by the fluid under pressure in the quick service volume chamber 31. Opening into this chamber 66 is one end of a passageway 68 that extends through the cover member 31 and the casing sections 22, 23 and 24, the ported gasket 26 (FIG. 1C) and the pipe bracket 8 to a quick action chamber 69 formed in this pipe bracket. Disposed in the one end of the passageway 68 (FIG. 1A) that opens into the chamber 66 is a screw-threaded choke 70. Consequently, the quick action chamber 69 (FIG. 1C) is charged with fluid under pressure from the quick service volume chamber 31 wich is supplied with fluid under pressure from the brake pipe 1, via the two chokes 65 and 70 in series. If the diameter of the choke 65 is selected to be 0.0210 inch, and the diameter of the choke 70 is selected to be 0.0760 inch, then the quick action chamber 69 will be charged at substantially the same rate as the quick action chamber 5 in the brake control valve devices presently used on freight cars owned and operated by American railroads.

The high pressure valve device 30 comprises a valve 71 that is normally biased against an annular valve seat 72 by a spring 73 that is interposed between this valve 71 and the second cover member 40. This valve seat 72 is formed at one end of a bore 74 that extends through the casing section 22 from the quick service volume chamber 31 to a chamber 75 into which opens one end of a passageway 76 that extends through the casing sections 22 and 23, ported gasket 26 (FIG. 1C) and pipe bracket 8 and is connected by a correspondingly numbered pipe to the emergency reservoir 3.

In order to effect unseating of the valve 71 from its seat 72 by operation of the piston 28, a valve stem 77 is slidably mounted in the bore 74. This stem 77 is provided with a peripheral annular groove in which is disposed an O-ring seal 78 and with an elongated peripheral annular groove 79 to enable, when the valve 71 is unseated from its seat 72, flow of fluid under pressure from the chamber 75 to a passageway 80 one end of which opens at the wall surface of the bore 74. This passageway 80 extends through the casing sections 22 and 23 to the gasket face 27 on the casing section 23 and thence the ported gasket 26 (FIG. 1C) to a passageway in the pipe bracket 8 that corresponds to the passageway 72 shown in the hereinbefore-mentioned U.S. Pat. No. 3,232,678. As explained in this patent, fluid under pressure is supplied from the auxiliary reservoir 2 (in the patent) to this passageway 72 (in the patent) whenever a service brake application is effected. Accordingly, it is apparent that, likewise, fluid under pressure is supplied from the auxiliary reservoir 4 (FIG. 1C) to the passageway 80 (FIGS. 1A and 1B) by operation of the service portion 11 (FIG. 1C) in response to a reduction of the pressure in the brake pipe 1 at a service rate.

Referring now to FIG. 1B of the drawings, it will be seen that the continual quick service valve device 34 comprises a valve stem 81 that is slidably mounted in a bore 82 formed in the casing section 23. Near its left-hand end, the valve stem 81 has formed integral therewith a first collar 83 against which abuts a sleeve member 84 that is provded with an outturned flange 85 to which is bonded a diaphragm 86. Intermediate the collar 83 and the left-hand end of the valve stem 81 there is provided a peripheral annular groove in which is disposed an O-ring seal 87. The left-hand end of the stem 81 has screw threads for receiving a nut 88 which, when tightened, forces the sleeve member 84 against the collar 83 to operatively connect the diaphragm 86 to the stem 81. The outer periphery of the diaphragm 86 is clamped between the casing section 23 and a third cover member 89 that is provided with a bottomed bore 90 into which extends the threaded portion of the stem 81 on which is mounted the nut 88. The cover member 89 is secured to the casing section 23 by any suitable means (not shown).

The diaphragm 86 cooperates with the casing section 23 and cover member 89 to form within the continual quick service valve device 34 and on opposite sides of the diaphragm 86 two chambers 91 and 92. Opening into the chamber 91 is one end of a passageway 93 that extends through the cover member 89 and casing section 23 and opens into the hereinbefore-mentioned passageway 68 that is connected to the quick action chamber 69 (FIG. 1C), as hereinbefore stated. The chamber 92 is connected to the brake pipe 1 in a manner which will now be explained.

Opening into the chamber 92 is one end of a passageway 94 that extends through the casing sections 23 and 24 and at its other end opens at the wall surface of a bore 95 in the casing section 24 it being noted that this bore 95 is coaxial with the bore 82 in the casing section 23. A fluted cup-shaped accelerated application cut-off valve 96 is slidably mounted in the bore 95 into which opens one end of a passageway 97 that extends through the casing 24 and at its other end opens into a chamber 98 (FIG. 1C) formed in the pipe bracket 8. Also opening into the chamber 98 is one end of a passageway 99 that is connected to the brake pipe 1 in the manner described in the hereinbefore-mentioned U.S. Pat. No. 3,232,678.

As shown in FIG. 1B, the continual quick service valve device 34 further comprises a poppet-type valve member 100 that has some suitable resilient material such as, for example, rubber, bonded to each side thereof to provide seating surfaces for engagement with a left-hand annular valve seat 101 or a right-hand annular valve seat 102. The valve seat 101 is formed on the casing section 23 at the right-hand end of the hereinbefore-mentioned bore 82 in this casing section and the valve seat 102 is formed on the inside of an annular cup-shaped exhaust valve seat member 103 that is disposed in a first counterbore 104 in the casing section 23 and coaxial with the bore 82, and a second counterbore 105 in the casing section 24 and coaxial with the bore 95, it being noted that the counterbores 104 and 105 have the same diameter which is somewhat greater than the outside diameter of the exhaust valve seat member 103 to enable a spring 106 to bias an out-turned flange 107 that is integral with the left-hand end of this exhaust valve member 103 against the bottom of the counterbore 104, this spring 106 being interposed between the out-turned flange 107 and the right-hand end of the counterbore 105.

As shown in FIG. 1B, the cup-shaped exhaust valve member 103 is formed integral with the right-hand end of a bushing 108 disposed in the bore 25 on the left-hand side of the accelerated application cut-off valve 96 and is provided with a plurality of arcuately arranged ports 109 two of which appear in FIG. 1B. When the valve member 100 is unseated from the seat 101, fluid under pressure can flow from the quick service volume chamber 31 to atmosphere via a passageway 110 that at one end opens into this chamber 31 and at the other at the wall surface of the bore 82, this bore 82, past the valve seat 101, ports 109, counterbores 104 and 105, and a passageway 111 in the casing section 24 that at one end opens at the wall surface of the counterbore 105 and at the other end at the exterior surface of the casing section 24.

The poppet-type valve member 100 is formed integral with the left-hand end of a hollow cylindrical member 112 that is slidably mounted in the bushing 108 and has an annular supply valve seat 113 formed on its right-hand end, as viewed in FIG. 1B. This cylindrical member 112 adjacent the valve seat 113 thereon is provided with a peripheral annular groove in which is disposed an O-ring seal 114 that forms a seal with the inside wall surface of the bushing 108. This bushing 108 in turn is provided with a pair of spaced-apart peripheral annular grooves in each of which is disposed an O-ring seal 115 that forms a seal with the wall surface of the bore 95 on the respective opposite sides of a port 116 in bushing 108 which port 116 is disposed between these O-ring seals 115. This port 116 is in alignment with one end of a passageway 117 that extends through the casing sections 23 and 22 and the first cover member 33 (FIG. 1A) and at its other end opens within the annular valve seat 67.

As shown in FIG. 1B, the port 116 is also in alignment with an elongated peripheral annular groove 118 provided on the cylindrical member 112 between the O-ring seal 114 carried thereon and a fluted collar 119 that is integral therewith. This fluted collar 119 cooperates with the O-ring 114 to guidably support the cylindrical member 112 within the bushing 108. This bushing 108 is provided with an internal shoulder 108a between which and the poppet-type valve member 100 is interposed a spring 120 that is normally effective to bias the left-hand seating surface on this valve member 100 into seating engagement with the valve seat 101 and the right-hand seating surface out of seating engagement with the valve seat 102, as shown in FIG. 1B.

As can be seen from FIG. 1B, a spring 121 is interposed between the accelerated application cut-off valve 96 and an annular spring seat 122 that is retained in the bore 95 by a snap ring 123 which is inserted in a groove provided therefor in the wall surface of the bore 95. This spring 121 normally biases a pair of slotted and diametrically arranged bosses 124 provided on the left-hand end of the accelerated application cut-off valve 96 against the right-hand end of the bushing 108 so that a disc 125 constructed of some suitable resilient material such as, for example, rubber and bonded to the left-hand end of this valve 96 is disposed out of seating engagement with the valve seat 113.

Since the passageway 99 (FIG. 1C) is connected to the brake pipe 1 in the manner described in the hereinbefore-mentioned U.S. Pat. No. 3,232,678, the fluid under pressure supplied from the brake pipe 1 to the passageway 99 will flow to the chamber 92 (FIG. 1B) at the right-hand side of the diaphragm 86 via chamber 98 (FIG. 1C), passageway 97 (FIG. 1B), bore 95, the flutes on the accelerated application cut-off valve 96 and passageway 94. The fluid under pressure thus supplied to the chamber 92 is effective to bias the diaphragm 86 against a plurality of arcuately-arranged stops 126 provided on the third cover member 89, two of these stops 126 appearing in FIG. 1B, so that an annular valve 127 formed on the right-hand end of the valve stem 81 is unseated from the resilient seating surface on the left-hand side of the valve member 100 which is biased against the valve seat 101 by the spring 120, as hereinbefore stated.

As shown in FIG. 1B, the valve 127 is formed at the right-hand end of a bottomed bore 128 that extends into the valve stem 81 from the right-hand end thereof to substantially the location of a collar 129 integral with the stem 81 and provided with a groove in which is disposed an O-ring seal 130 that forms a seal with the wall surface of the bore 82 on the left-hand side of the hereinbefore-mentioned other end of the passageway 110 that opens at the wall surface of this bore 82. The valve stem 81 is provided with a cross-bore 131 of small diameter so as to constitute a choke that at one end opens into the bottom bore 128 and at the other end at the peripheral surface of the valve stem 81 on the right-hand side of the collar 129 and the O-ring seal 130 carried thereby.

Referring to FIGS. 1A and 1B, it will be seen that some of the fluid under pressure supplied from the brake pipe 1 to the interior of the bore 95, in the manner explained above, will flow to the quick service volume 31 via the slotted and arcuately arranged bosses 124, the interior of bushing 108, past valve seat 113, hollow cylindrical member 112, past unseated valve 127 to the bore 82, and also to this bore 82 via the bottomed bore 128 and choke 131, and thence through the passageway 110 so that the quick service volume 31 is charged to the pressure carried in the brake pipe 1.

As shown in FIG. 1B, the exhaust valve seat member 103 is provided with a bore 132 and a coaxial counterbore 133. The bore 132 constitutes a quick action chamber blowdown choke and in actual practice, as in heretofore constructed railway freight car brake control valve devices, has a diameter of 0.020 inch.

The emergency accelerated release valve mechanism 35, which is embodied in the continual quick service valve device 34, as hereinbefore stated, comprises a resilient annular valve seat 134 that abuts a shoulder 135 formed on the casing section 23 and a cup-shaped piston valve member 136 that is normally biased against the valve seat 134 by a spring 137 which is interposed between this piston valve member 136 and a spring seat 138. The piston valve member 136 is provided with a peripheral annular groove in which is disposed an O-ring seal 139 that forms a seal with the wall surface of a counterbore 140 which is coaxial with the bore 82 in the casing section 23 and with a perforated sleeve member 141 that is integral with the bottom of this cup-shaped piston member and disposed about the valve stem 81 on the inside of the spring 137. The outer end of the sleeve member 141 is provided with internal screw threads that have screw-threaded engagement with external screw threads formed on an annular member 142 the inside diameter of which is slightly greater than the outside diameter of the first collar 83 that is integral with valve stem 81 but substantially less than the outside diameter of a second collar 143 that is also integral with the valve stem 81 and spaced apart from the first collar 83 on the right-hand side thereof, as viewed in FIG. 1B.

The check valve devices 36 and 37 are identical in construction. Hence, a description of the elements of one will suffice for the corresponding elements of the other. However, the elements of the spill-over check valve device 37 will be distinguished from those of the emergency accelerated release check valve device 36 by the addition of a prime (') to the numeral for each respective corresponding element of the check valve device 37.

Referring to FIG. 1B, the check valve device 36 comprises an annular valve seat 144 and an annular disc valve 145 normally biased against the valve seat 144 by a spring 146.

Opening within the annular valve seat 144 is one end of a short passageway 147 that extends through the casing section 23 and at its opposite end opens into the passageway 80. Consequently, the spring 146 normally biases the disc valve 145 against its seat 144 to cut off flow from the passageway 147 to a chamber 148 into which opens one end of a passageway 149 that extends through the casing section 23 and at its opposite end opens into an annular chamber 150 that is on the outside of the annular valve seat 134.

Opening within the annular valve seat 144' is one end of a short passageway 151 that extends through the casing section 23 and at its opposite end opens into the passageway 68. Consequently, the spring 146' normally biases the disc valve 145' against its seat 144' to cut off flow from the passageway 151 to a chamber 152 into which opens one end of a passageway 153 that extends through the casing section 23 and at its opposite end opens into the hereinbefore-mentioned passageway 76 intermediate the ends thereof.

The inshot valve device 38 shown in FIG. 1B comprises a disc valve 154 mounted in a chamber 155 and yieldingly urged by means of a spring 156 toward an annular valve seat 157. This valve seat 157 is formed at one end of a bore 158 that at its opposite end opens into a chamber 159 that is constantly connected to the brake cylinder 2 (FIG. 1C) by a passageway and correspondingly numbered pipe 160.

The chamber 155 is connected by a passageway 161 to the passageway 80. A choke 162 and a short passageway 163 connect the passageways 160 and 161.

A resilient flat abutment 164, constructed of, for example, rubber is bonded to one side of a disc or plate 165 and has its outside periphery clamped between a casing section 166 and the casing section 25 of the inshot valve device 38, the casing section 25 being secured by any suitable means (not shown) to a flat face 167 on the casing section 23. This abutment 164 cooperates with the casing sections 166 and 25 to form on its respective opposite sides a chamber 168 and the above-mentioned chamber 159.

The casing section 166 is provided with a bore 169 that at one end opens into the chamber 168 and at the other end into a chamber 170 formed by the cooperative relationship of the casing section 166 and a cover member 171 secured to this casing section 166 by any suitable means (not shown).

A hollow cylindrical spring seat member 172 is slidably mounted in the bore 169 and is provided at one end with an outturned flange 173 that is normally biased against a shoulder 174 formed between the bore 169 and a coaxial counterbore 175 by a spring 176 that is stronger than the spring 156 and is interposed between this flange 173 and the cover member 171. This spring seat member 172 is further provided with a peripheral annular groove in which is disposed an O-ring seal 177 that forms a seal with the wall surface of the bore 169 to prevent leakage of fluid under pressure from the chamber 168 to the chamber 170 and vice versa.

As shown in FIG. 1B, a hollow cylindrical valve seat member 178 that has an annular valve seat 179 formed at one end and an out-turned flange 180 at the other is so slidably mounted in the hollow cylindrical spring seat member 172 that the out-turned flange 180 is normally biased against the out-turned flange 173 by a spring 181 that is lighter than the spring 156 and is interposed between this flange 180 and the cover member 171, it being noted that the length of this valve seat member 178 is such that the valve seat 179 is disposed outside of the hollow cylindrical spring seat member 172, within the chamber 168 and a short distance away from the left-hand side of the abutment 164.

As further shown in FIG. 1B, opening into the chamber 170 is one end of a passageway 182 that extends through the casing sections 166, 25 and 23 and at its opposite end opens into the chamber 92 which is connected to the brake pipe 1 in a manner hereinbefore described. Consequently, fluid under pressure is supplied from the brake pipe 1 to the chamber 170 from whence it flows to the chamber 168 via the hollow valve seat member 178. Since the chamber 159 is connected to the brake cylinder 2 in the manner hereinbefore described, it is apparent that the abutment 164 may be subject on one side to brake cylinder pressure present in the chamber 159 and on the other to brake pipe pressure present in the chamber 168.

Referring to FIG. 1B, it will be noted that opening into the passageway 182 intermediate the ends thereof is one end of a passageway 183 that extends through the casing sections 23 and 22 (FIG. 1A) and at its opposite end opens into the hereinbefore-mentioned chamber 49 via a choke 184 disposed in this opposite end of the passageway 183. Since fluid under pressure is supplied from the brake pipe 1 to the chamber 92, as noted above, it is apparent that fluid under pressure applied from the brake pipe 1 to the chamber 92 can flow to the chamber 49 via the passageways 182 and 183 and the choke 184 in addition to flow past valve 53 from chamber 31.

It may be further noted that fluid under pressure can flow from the chamber 49 to the brake pipe 1 at a rate determined by the diameter of the choke 184, and from the chamber 46 to the brake pipe 1 at an unrestricted rate. Consequently, when a service brake application is effected, a higher pressure is maintained in the chamber 49 to prevent unseating of the diaphragm 39 from the valve seat 42 which would cause an undesired emergency brake application.

OPERATION - FIGS. 1A, 1B and 1C

Initial Charging

Let it be assumed that a railway freight car provided with the brake control valve device 5 shown in FIGS. 1A, 1B and 1C of the drawings has been coupled into a train of cars, and that a handle of an engineer's brake valve device (not shown) located on the locomotive coupled to the head end of the train is in its release position. Therefore, while the handle of the engineer's brake valve device is in its release position, the relay valve device of this brake valve device will effect the supply of fluid under pressure to the train brake pipe and therefore to the brake pipe 1 to charge the train brake pipe to a preselected normal charged value which, for example, may be seventy pounds per square inch.

Fluid under pressure supplied to the brake pipe 1 (FIG. 1C) will flow via the branch pipe 7 and combined cut-out cock and dirt collector 6 to the brake control valve device 5 to cause the service valve portion 11 of this control valve device 5 to operate in the usual well-known manner of railway freight car brake control valves to effect a release of fluid under pressure from the brake cylinder 2 thereby releasing the brakes on the car and to charge the emergency reservoir 3 and auxiliary reservoir 4 to the pressure carried in the brake pipe 1.

Fluid under pressure supplied to the brake pipe 1 will flow therefrom through the branch pipe 7 and combined cut-out cock and dirt collector 6 to the passageway 48 in the pipe bracket 8 and thence from this passageway 48 to: (1) the chamber 46 (FIG. 1A) via the ported gasket 26 and the passageway 47, (2) the chamber 92 (FIG. 1B) via a passageway 185, a chamber 186, a strainer device 187, passageway 99, chamber 98, passageway 97 (FIG. 1B), bore 95, and passageway 94, (3) the chamber 170 from the chamber 92 via passageway 182, (4) the quick service volume chamber 31 from the bore 95 via the slotted and diametrically arranged bosses 124, the interior of bushing 108, past valve seat 113, hollow cylindrical member 112, past unseated valve 127 to the bore 82, and also to this bore 82 via the bottomed bore 128 and the choke 131, and thence from the bore 82 through the passageway 110, (5) the chamber 49 (FIG. 1A) from the passageway 182 (FIG. 1B) via the passageway 183, and choke 184, and (6) the chamber 49 from the quick service volume chamber 31 past the disc valve 53 and through the counterbore 51.

It may be noted that the bore 60 in the emergency piston 28 enables both sides of this piston to be subject to the pressure in the quick service volume chamber 31.

Furthermore, fluid under pressure will flow from the quick service volume chamber 31 at a restricted rate determined by the size of the chokes 65 and 70 to: (1) the quick action chamber 69 (FIG. 1C) via the choke 65, chamber 66, choke 70, and passageway 68, and (2) the chamber 91 from the passageway 68 via the passageway 93.

It will be noted that the chamber 91 is charged with fluid under pressure via the chokes 65 and 70 in series whereas no choke restricts the flow of fluid under pressure from the brake pipe 1 to the chamber 92. Consequently, the pressure in the chamber 92 will build up faster than in the chamber 91 so that the left-hand side of the diaphragm 86 is maintained against the stops 126 so that the valve 127 is held unseated from the seating surface on the left-hand side of valve member 100 to enable flow of fluid under pressure to the passageway 110 past the unseated valve 127 and also through the choke 131 in parallel.

Assuming that no fluid under pressure is present in the brake cylinder 2 (FIG. 1C) at the time the freight car is coupled into the train, there is no flow of fluid under pressure from this brake cylinder 2 to the brake pipe 1 via the emergency accelerated release check valve device 36 (FIG. 1B) and the emergency accelerated release valve mechanism 35.

SERVICE APPLICATION

A service application of the brakes is initiated by the locomotive engineer moving the handle of the engineer's brake valve device on the locomotive arcuately from its release position to a position in its application zone corresponding to the degree of brake application desired, whereupon the relay valve device of this brake valve device will effect a gradual reduction in brake pipe pressure at a service rate in the usual well-known manner. The service portion 11 (FIG. 1C) of the brake control valve device 5 will operate in the usual manner of the service portion of heretofore known railway freight car brake control valve devices to effect the supply of fluid under pressure from the auxiliary reservoir 4 to the brake cylinder 2 to cause a service brake application on the freight car provided with this control valve device 5.

As the pressure in the brake pipe 1 is reduced at a service rate, the pressure in the chamber 92 (FIG. 1B) on the right-hand side of the diaphragm 86 will be correspondingly reduced at a service rate.

Since the chokes 65 and 70 restrict the rate of flow of fluid under pressure from the chambers 91 and 66 and quick action chamber 69 (FIG. 1C) to the brake pipe 1, it is apparent that the pressure in the chamber 92 at the right-hand side of the diaphragm 86 is reduced faster than the pressure in the chamber 91 at the left-hand side of this diaphragm 86. Consequently, a differential fluid pressure force is established which acts in the direction to deflect the diaphragm 86 in the direction of the right-hand and thereby effect shifting of the stem 81 in this same direction.

As the stem 81 is thus shifted in the direction of the right hand, as viewed in FIG. 1B, the valve 127 on the right-hand end of this stem 81 is shifted into engagement with the resilient seating surface on the left-hand side of the valve member 100 to close communication between the brake pipe 1 and the quick service volume chamber 31 except for the restricted communication provided by the choke 131.

As the diaphragm 86 is further deflected in the direction of the right hand, the stem 81, valve 127 and valve member 100 are shifted in the direction of the right hand in response to the increasing differential fluid pressure force. Therefore, the resilient seating surface on the left-hand side of the valve member 100 is unseated from the valve seat 101.

While the resilient seating surfaces on the opposite sides of valve member 100 are unseated from the spaced-apart valve seats 101 and 102, fluid under pressure will flow from the quick service volume chamber 31 (FIG. 1A) to atmosphere via passageway 110, interior of bore 82 (FIG. 1B), past valve seat 101, ports 109, counterbore 105 and passageway 111.

Since the volume of the chamber 31 is comparatively small, the pressure therein is quickly reduced so that quick action chamber pressure, which is present in the chamber 66 and acting on the left-hand side of the diaphragm-type valve 32, unseats this valve 32 from the valve seat 67.

Upon the unseating of diaphragm valve 32 from the valve seat 67, fluid under pressure will flow from the chamber 91 (FIG. 1B) at the left-hand side of the diaphragm 86 and the quick action chamber 69 (FIG. 1C) to atmosphere via passageways 93 (FIG. 1B) and 68, choke 70 (FIG. 1A), chamber 66, past seat 67, passageway 117, port 116 (FIG. 1B), groove 118, fluted collar 118, past valve set 102, ports 109, counterbore 105 and passageway 111.

It will be noted that at this time fluid under pressure will flow from the brake pipe 1 (FIG. 1C) to atmosphere via branch pipe 7, combined cut-out cock and dirt collector 6, passageways 48 and 185, chamber 186, strainer 187, passageway 99, chamber 98, passageway 97 (FIG. 1B), bore 95, the slotted and diametrically arranged bosses 124, the interior of bushing 108, past valve set 113, hollow cylindrical member 112, bottomed bore 128, choke 131, bore 82, past valve seat 101, ports 109, counterbore 105 and passageway 111 at a rate determined by the size of the choke 131. This flow of fluid under pressure from the brake pipe 1 to atmosphere at a rate determined by the size of the choke 131 provides an initial quick service reduction of the pressure in the brake pipe 1.

The diameter of the choke 70 (FIG. 1A) is 0.0760 inch, as hereinbefore stated, which size is such that fluid under pressure can now flow from the chamber 91 (FIG. 1B) and the quick action chamber 69 (FIG. 1C) to atmosphere via the pathway described above faster than fluid under pressure can flow from the chamber 92 (FIG. 1B) and the train brake pipe to atmosphere via the relay valve device of the engineer's brake valve device on the locomotive and from the brake pipe 1 to atmosphere via the choke 131 in the manner described above. Consequently, when the pressure in the chamber 91 becomes less then that in the chamber 92, a differential fluid pressure force will be established on the diaphragm 86 to deflect this diaphragm in the direction of the left-hand, as viewed in FIG. 1B. Accordingly, this deflection of the diaphragm 86 in the direction of the left hand is effective to shift the valve stem 81 and valve 127 in this same direction. As the valve 127 is thus shifted in the direction of the left hand, the spring 120 will shift the valve member 100 in this direction until the resilient seating surface on the left-hand side thereof engages the valve seat 101, it being noted that this seating surface also engages the valve 127.

Upon this resilient seating surface on the valve member 100 engaging the valve seat 101, the flow of fluid under pressure from the chamber 92 to atmosphere via the passageway 111 is cut off, it being noted that the flow of fluid under pressure from the quick sevice volume chamber 31 (FIG. 1A) to atmosphere past the valve seat 101 is likewise cut off.

It will be noted that fluid under pressure will continue to flow from the chamber 91 (FIG. 1A) to atmosphere via passgeways 93 and 68, choke 70, chamber 66, passageway 117, port 116, groove 118, fluted collar 119, past valve seat 102, ports 109, counterbore 105, and passageway 111.

Accordingly, the pressure in the chamber 91 and the quick action chamber 69 (FIG. 1C) will quickly be reduced below the pressure in the chamber 92 (FIG. 1B). Therefore, this pressure in the chamber 92 will establish a differential fluid pressure force which acts in the direction of the left hand, as viewed in FIG. 1B, on the diaphragm 86.

It is apparent that this differential fluid pressure force deflects the diaphragm 86 in the direction of the left hand which in turn shifts the valve stem 81 and valve 127 in the same direction so that this valve 127 is moved out of seating engagement with the resilient seating surface on the left-hand side of the valve member 100.

Upon this unseating of the valve 127 from the seating surface on the left-hand side of the valve member 100, fluid under pressure will flow from the brake pipe 1 to the quick service volume chamber 31 via the pathway hereinbefore described, it being noted that this pathway includes flow past the unseated valve 127 and through the choke 131 in parallel notwithstanding that fluid under pressure is being released from the train brake pipe to atmosphere via the relay valve device of the engineer's brake valve device on the locomotive. Accordingly, the quick service volume chamber 31 will be recharged to the reduced pressure remaining in the train brake pipe.

Fluid under pressure is now flowing from the chamber 91 to atmosphere via choke 70 and the chamber 66, as stated above. Consequently, the supply of fluid under pressure from the brake pipe 1 to the quick service volume chamber 31 to recharge this chamber will quickly establish a differential fluid pressure force that acts in the direction of the left hand on the diaphragm valve 32 to deflect it into engagement with the valve seat 67.

This engagement of the diaphragm valve 32 with the valve seat 67 cuts off further flow from the chamber 91 (FIG. 1B) and the quick action chamber 69 (FIG. 1C) to atmosphere. Consequently, the remaining fluid under pressure in these chambers is trapped therein.

Since the handle of the engineer's brake valve device is still in the position in its application zone to which it was moved by the locomotive engineer, fluid under pressure continues to be released from the train brake pipe to atmosphere via the relay valve device of the engineer's brake valve device. Consequently, fluid under pressure will continue to flow from the chamber 92 (FIG. 1B) to atmosphere via the passageway 94, bore 95, passageway 97, chamber 98 (FIG. 1C), passageway 99, strainer 187, chamber 186, passageways 185 and 48, combined cut-out cock and dirt collector 6, branch pipe 7, the train brake pipe and the relay valve device of the engineer's brake valve device.

When the flow of fluid under pressure from the chamber 92 (FIG. 1B) to atmosphere via the relay valve device of the engineer's brake valve device has reduced the pressure in this chamber 92 to a value less than the trapped pressure in the chamber 91 and the quick action chamber 69 (FIG. 1C), the continual quick service valve device 34 (FIG. 1B) and the diaphragm valve (FIG. 1A) will operate the cycle hereinbefore described to vent the fluid under pressure in the quick service volume chamber 31 (FIG. 1A) to atmosphere, thereafter release fluid under pressure from the chamber 91 (FIG. 1B) and the quick action chamber 69 (FIG. 1C) to atmosphere until the pressure in these chambers is reduced sufficiently to cause the continual quick service valve device 34 (FIG. 1B) to effect the recharge of the quick service volume chamber 31 with fluid under pressure from the train brake pipe which fluid under pressure in chamber 31 is effective to cause reseating of the diaphragm valve 32 on the valve seat 67 thereby trapping fluid under pressure in the chamber 91 (FIG. 1B) and the quick action chamber 69 (FIG. 1C) to cause the continual quick service valve device 34 (FIG. 1B) and diaphragm valve 32 (FIG. 1A) to again repeat the above-described cycle of operation. Therefore, the continual quick service valve device 34 and the diaphragm valve 32 operate in successive repeated cycles to release fluid under pressure from the chambers 31, 69 and 91 to atmosphere and recharge the chamber 31 from the train brake pipe during each cycle so long as fluid under pressure is being released from the train brake pipe via the relay valve device of the engineer's brake valve device located on the locomotive.

It should be noted that the repeated recharge of the quick service volume chamber 31 (FIG. 1A) from the train brake pipe effects a local quick service reduction of the pressure in the train brake pipe, and that the repeated release of fluid under pressure from the chamber 91 (FIG. 1B) and the quick action chamber 69 (FIG. 1C) to atmosphere causes the pressure in these chambers to be reduced substantially simultaneously as the pressure in the train brake pipe is reduced when a service brake application is effected, whereby the emergency piston 28 (FIG. 1A) is rendered ineffective to operate the vent valve device 29 to cause an undesired emergency brake application.

It should be understood that when the relay valve device of the engineer's brake valve device has released fluid under pressure from the train brake pipe to atmosphere until the pressure in the train brake pipe has been reduced to a value corresponding to the position in its application zone to which the handle of the brake valve device was moved by the engineer, this relay valve device will cease to release fluid under pressure from the train brake pipe and, therefore, from the chamber 92 (FIG. 1B) in the continual quick service valve device 34.

Moreover, it should be further understood that upon the termination of the release of fluid under pressure from the chamber 92 and the train brake pipe to atmosphere via the relay valve device of the engineer's brake valve device, the continual quick service valve device 34 and the diaphragm valve 32 will cease to operate in cycles to release fluid under pressure from the train brake pipe to atmosphere to cause a local quick service reduction of the pressure of the fluid in the train brake pipe.

SERVICE LAP

When the relay valve device of the engineer's brake valve device terminates the release of fluid under pressure from the train brake pipe, the release of fluid under pressure from the chamber 92 (FIG. 1B) is likewise terminated, whereupon the continual quick service valve device 34 and the diaphragm valve 32 cease to operate in successive cycles to release fluid under pressure from the train brake pipe and the quick action chamber 69 (FIG. 1C) to atmosphere.

Furthermore, when the release of fluid under pressure from the train brake pipe, and, therefore, the brake pipe 1 (FIG. 1C) is terminated, the service valve device 11 will move to a lap position to cut off flow of fluid under pressure from the auxiliary reservoir 4 to the brake cylinder 2.

EMERGENCY APPLICATION

To effect an emergency application of the brakes, fluid under pressure is suddenly vented at a rapid rate from the brake pipe 1. Upon this rapid rate of reduction of pressure in the brake pipe 1, the service valve device 11 will operate to supply fluid under pressure from the auxiliary reservoir 4 (FIG. 1C) to the passageway 80 (FIG. 1B).

Moreover, the emergency valve device 12 operates in the manner explained above to release fluid under pressure from the chamber 91 and quick action chamber 69 (FIG. 1C) to atmosphere via the choke 70 (FIG. 1A). This rate of release of fluid under pressure from the chamber 91 (FIG. 1B) on the left-hand side of diaphragm 86 is less than the emergency rate of release of fluid under pressure from the chamber 92 on the right-hand side of this diaphragm 86 via the brake pipe 1 and the train brake pipe.

Therefore, it is apparent that a differential of pressure is quickly established on the diaphragm 86 which acts in the direction of the right hand to deflect this diaphragm in this same direction and thereby shift the stem 81, valve 127 and valve member 100 toward the right.

As the stem 81 and valve member 100 are thus further shifted in the direction of the right hand, the seating surface on the right-hand side of the valve member 100 will be seated on the valve seat 102.

Upon this seating of the valve member 100 on valve seat 102, fluid under pressure will no longer flow from the chamber 91 at the left-hand side of the diaphragm 86 and the quick action chamber 69 (FIG. 1C) to atmosphere via passageways 93 (FIG. 1B) and 68, choke 70 (FIG. 1A) and the pathway described above. However, fluid under pressure may flow from the chamber 91 (FIG. 1B) and the quick action chamber 69 (FIG. 1C) to atmosphere at a restricted rate via passageways 93 (FIG. 1B) and 68, choke 70 (FIG. 1A), chamber 66, passageway 117, port 116 (FIG. 1B), groove 118, fluted collar 119, quick action chamber blowdown choke 132, counterbores 133 and 105 and passageway 111. This restricted flow of fluid under pressure from the chamber 66 (FIG. 1A) to atmosphere causes a buildup of pressure in this chamber which acts on the entire effective area of the left-hand side of the diaphragm valve 32 to shift this diaphragm valve 32 and the emergency piston 28 in the direction of the right hand, as viewed in FIG. 1A, against the yielding resistance of the spring 58 to an emergency position in which the disc valve 53 is unseated from its seat 52 by the fluted stem 54, and the valve 71 is unseated from its seat 72 by the stem 77 and shifted in the direction of the right hand, as viewed in FIG. 1A, until this valve 71 abuts the second cover member 40.

Upon the unseating of the valve 53 from its seat 52, fluid under pressure in the chamber 49 will flow to atmosphere via hollow spring seat 56, counterbore 51, past valve seat 52, bore 50, chamber 31, passageway 110, bore 82 (FIG. 1B), past valve seat 101, ports 109, counterbore 105 and passageway 111.

Brake pipe pressure which is present in the chamber 46 (FIG. 1A) will now unseat diaphragm 39 from valve seat 42.

Fluid under pressure will now flow from the brake pipe 1 and the train brake pipe to atmosphere via the bore 41 of large diameter for the purpose of serially transmitting an emergency rate of reduction of pressure in the train brake pipe extending through the train in the usual well-known manner.

As the stem 77 is shifted in the direction of the right hand, the O-ring seal 78 on the stem 77 is moved to a position in which it forms a seal with the wall surface of the bore 74 at a location that is on the left-hand side of the location at which the hereinbefore-mentioned one end of the passageway 80 opens at the wall surface of this bore 74. Therefore, fluid under pressure will flow from the emergency reservoir 3 (FIG. 1C) to the passageway 80 (FIG. 1A) via pipe and passageway 76, chamber 75, past valve seat 75 and groove 79. Fluid under pressure thus supplied to the passageway 80 from the emergency reservoir 3 combines with that supplied to this passageway 80 from the auxiliary reservoir 4 by operation of the service valve device 11 and flows therefrom to the passageway 161 (FIG. 1B) and thence to a pressure chamber (not shown) within the brake cylinder 2 (FIG. 1C) via a chamber 188 (FIG. 1B) and a passageway 189 in the inshot valve device 38, the chamber 155, past the valve 154 which is unseated from the valve seat 157, the bore 158, chamber 159, and passageway and pipe 160.

The fluid under pressure thus supplied to the pressure chamber within cylinder 2 will act on one side of the piston (not shown) therein and move this piston outward against the yielding resistance of the brake cylinder release spring (not shown) that acts on the other side of this piston. As this piston is thus moved, it increases the volume of the pressure chamber to which fluid under pressure is being supplied from the chamber 159 (FIG. 1B) below the abutment 164.

It will be noted that when an emergency brake application is made, all fluid under pressure is vented from the chambers 168 and 170 on the left-hand side of the abutment 164. Therefore, as the pressure in the chamber 168 is reduced to zero, this abutment 164 is deflected in the direction of the left hand by the spring 156 acting through the valve 154, a fluted stem 154a and the disc 165 until the abutment 164 engages valve seat 179 on the right-hand end of the valve seat member 178.

The spring 156 continues to deflect the abutment 164 in the direction of the left hand to shift the valve seat member 178 in this direction against the yielding resistance of the spring 181 until the abutment 164 is moved into abutting relationship with the right-hand end of the spring seat member 172, the out-turned flange 173 of which is biased against the shoulder 174 by the spring 176 which, as hereinbefore stated, is stronger than the spring 156. The length of the fluted stem 154a is such that the disc valve 154 is still unseated from the valve seat 157.

Consequently, the fluid under pressure supplied to the passageway 161 will flow through the choke 162 and passageway 163 to the passageway 160 and also to this passageway 160 via the chamber 188, passageway 189, chamber 155, past the valve seat 157, between the fluted valve stem 154a and the wall of the bore 158 and the chamber 159. Therefore, fluid under pressure is supplied from the passageway 161 to the passageway and pipe 160 which is connected to the brake cylinder 2 via the choke 162 and the bore 158 in parallel until the pressure in the chamber 159 on the right-hand side of the abutment 164 is increased sufficiently to overcome the yielding resistance of the two springs 181 and 176.

The strength of the two springs 181 and 176 may be so selected that when the pressure in the chamber 159 is increased to a chosen value, such as, for example, fifteen pounds per square inch, the abutment 164 will be deflected in the direction of the left hand against the yielding resistance of the springs 176 and 181 whereupon the spring 156 will shift the valve 154 into seating engagement with the valve seat 157 thereby closing off the rapid flow of fluid under pressure to the brake cylinder 2 by way of the annular valve seat 157. With the valve 154 thus seated on valve seat 157, fluid under pressure continues to flow from the passageway 161 to the brake cylinder 2 (FIG. 1C) via the chamber 188, choke 162 (FIG. 1B), passageway 163 and passageway and pipe 160 (FIGS. 1B and 1C), the choke 162 forming a bypass communication around the valve 154 which is now seated on the valve seat 157. The choke 162 provides for the second stage of increase in brake cylinder pressure at a slower rate. The pressure in the brake cylinder 2 will now continue to build up at this slower rate determined by the size of the choke 162 until equalization of the pressure in the auxiliary reservoir 4, emergency reservoir 3 and brake cylinder 2 occurs.

From the foregoing, it is apparent that the emergency valve device 12 of the brake control valve device 5 provides a two-stage buildup of pressure in the brake cylinder 2.

Since fluid under pressure is supplied from both the auxiliary reservoir 4 and the emergency reservoir 3 to the brake cylinder 2 when an emergency brake application is effected, it is apparent that a higher pressure is obtained in the brake cylinder 2 than is the case when a service brake application is effected.

It will be noted that the fluid under pressure trapped in the chamber 91 (FIG. 1B) on the left-hand side of diaphragm 86 and in the quick action chamber 69 (FIG. 1C) upon seating of the seating surface on the right-hand side of valve member 100 on valve seat 102 in the manner described above may flow to the atmosphere via the passageways 93 and 68, choke 70, chamber 66, passageway 117, port 116, groove 118, fluted collar 119, choke 132, counterbore 133, counterbore 105 and passageway 111.

As hereinbefore stated, when an emergency brake application is effected, the diaphragm valve 32 and the emergency piston 28 are shifted in the direction of the right hand by quick action chamber pressure present in the chamber 66 to unseat valve 53 from its seat 52 to release fluid under pressure from the chamber 49 to atmosphere to cause unseating of the vent valve diaphragm 39 from its seat 42 by brake pipe pressure in the chamber 46. This vent valve diaphragm 39 cannot be reseated on its seat 42 as long as the chamber 49 is open to atmosphere past the valve 53 which is held unseated from its seat 52 by the emergency piston 28 and diaphragm valve 32 that is subject on its right hand side to quick action chamber pressure in the chamber 66.

It being noted, as explained above, that fluid under pressure is being released from the quick action chamber to atmosphere via the chokes 70 and 132 in series, it is apparent that the size of these chokes determine how long the vent valve diaphragm 39 remains unseated from its seat 42. Accordingly, the size of the chokes 70 and 132 is so selected as to prevent the spring 43 from reseating the vent valve diaphragm 39 on its seat 42 until a sufficient period of time has elapsed as is necessary for the emergency brake application to bring the train to a stop.

When all fluid under pressure is released from the quick action chamber 69 (FIG. 1C) and the brake pipe 1 and, therefore, from the chambers 91 (FIG. 1B) and 92 (FIG. 1B), the diaphragm 86, stem 81 and valve 127 thereon and diaphragm valve 32 will be returned to the position shown in FIGS. 1B and 1A by the resiliency of the diaphragm 86 and the diaphragm valve 32.

RELEASE OF THE BRAKES AFTER AN EMERGENCY APPLICATION

To effect a release of the brakes after an emergency application, fluid under pressure is supplied to the brake pipe 1 from whence it flows to the chamber 92 on the right-hand side of diaphragm 86 (FIG. 1B), the quick service volume chamber 31 on the right-hand side of the diaphragm valve 32 (FIG. 1A) and the chamber 170 on the left-hand side of the abutment 164 (FIG. 1B).

Moreover, fluid under pressure flows from the brake pipe 1 to the chamber 16 (FIG. 1C) above the diaphragm 15 in the service valve device 11 at a restricted rate determined by the size of a choke 190.

It will be noted from FIGS. 1A and 1B of the drawings that fluid under pressure flows at an unrestricted rate to the chambers 92 and 31 in the emergency valve device 12 since there are no chokes in the passageways 97, 94 and 110.

Furthermore, it will be noted from FIG. 1A that the chokes 65 and 70 restrict the rate of flow of fluid under pressure from the quick service volume chamber 31 to the chamber 66, the chamber 91 on the left-hand side of the diaphragm 86, and the quick action chamber 69 (FIG. 1C). Accordingly, it is apparent that the pressure in the chamber 92 on the right-hand side of the diaphragm 86 (FIG. 1B) will increase more rapidly than will the pressure in the chamber 91 on the left-hand side of this diaphragm.

Moreover, it is apparent that the more rapid rate of increase of pressure in the chamber 92 quickly establishes a fluid pressure differential force which is effective to deflect the diaphragm 86 in the direction of the left hand, as viewed in FIG. 1B, and shift the valve stem 81 in this same direction.

As the valve stem 81 is thus shifted in the direction of the left hand, collar 143 thereon first abuts the annular member 142 and thereafter, via the sleeve member 141 that is integral with the piston valve member 136, shifts this piston valve member 136 in the direction of the left hand against the yielding resistance of spring 137 to unseat valve member 136 from valve seat 134, it being noted that the spring seat 138 limits the distance that the piston valve member 136 may be shifted in the direction of the left hand.

When the piston valve member 136 is thus unseated from its seat 134, fluid under pressure will flow from the brake cylinder 2 (FIG. 1C), and the auxiliary reservoir 4 connected thereto via the service valve device 11 which is still in its service application position to the brake pipe 1 via pipe and passageway 160, chamber 159 (FIG. 1B), past valve seat 157 and through choke 162, chamber 155, passageways 189, 161, and 147, past valve seat 144, check valve 145 being unseated against the yielding resistance of the spring 146, chamber 148, passageway 149, chamber 150, past valve seat 134, through sleeve member 141 of valve member 136, chamber 92, passageway 94, bore 95, passageway 97, chamber 98 (FIG. 1C), passageway 99, strainer device 187, chamber 186, the passageways 185 and 48 in the pipe bracket 8, combined cut-out cock and dirt collector 6 and branch pipe 7.

The above-mentioned flow of fluid under pressure from the brake cylinder 2 and auxiliary reservoir 4 to the brake pipe 1 accelerates the rate of recharge of the brake pipe. This action naturally occurs first at the head end of the train when the increase in brake pipe pressure is first effected, and the sudden increase in brake pipe pressure on one car causes the emergency valve device on the next car to function in the same manner, so that this back dump operation is rapidly transmitted serially from car to car throughout the length of the train.

It will be noted from FIG. 1B that some of the fluid under pressure supplied from the brake cylinder 2 and auxiliary reservoir 4 to the passageway 94, in the manner described above, flows from this passageway 94 to the quick service volume chamber 31 and chamber 49 (FIG. 1A) via bore 95, the slotted and diametrically arranged bosses 124, interiof of bushing 108, past valve seat 113, hollow cylindrical member 112, past now unseated valve 127 to the bore 82, and also to this bore 82 via the bottomed bore 128 and choke 131, and passageway 110.

As the pressure in the quick service volume chamber 31 increases, the diaphragm valve 32 will be deflected in the direction of the left hand into seating engagement with the valve seat 67.

As the diaphragm valve 32 is thus deflected in the direction of the left hand by the increasing pressure in the quick service volume chamber 31, the spring 58 shifts the emergency piston 28 in this direction which allows spring 55 to seat valve 53 on its seat 52 and the spring 73 to seat valve 71 on its seat 72 subsequent to the chambers 31 and 49 becoming charged to the normal fully charged pressure carried in the train brake pipe.

Subsequent to the seating of diaphragm valve 32 on the valve seat 67, fluid under pressure will flow from the quick service volume chamber 31 to the chamber 91 (FIG. 1B) and the quick action chamber 69 (FIG. 1C) via choke 65, chamber 66, choke 70, and passageways 68 and 93 until these chambers are charged to the pressure carried in the train brake pipe.

As the pressure in the chamber 91 (FIG. 1B) is thus charged to the pressure in the train brake pipe and in the chamber 92 on the opposite side of the diaphragm 86, the spring 137 is rendered effective to shift valve member 136, collar 143 and stem 82 in the direction of the right hand until the valve member 136 engages the valve seat 134.

The elements of the continual quick service valve device 34, the emergency accelerated release valve mechanism 35, the vent valve device 29, the high pressure valve device 30 and diaphragm valve 32 now occupy their release position in which they are shown in FIGS. 1A and 1B.

As fluid under pressure is supplied to the chamber 16 (FIG. 1C) in the manner described above, the resulting increase in pressure in this chamber 16 will deflect the diaphragm 15 downward to thereby return the graduating valve 19 and the service valve 20 of the service valve device 11 to the position shown. The fluid under pressure now remaining in the brake cylinder 2 will flow to atmosphere via pipe and passageway 160, chamber 159 (FIG. 1B), past valve seat 157, bore 158, choke 162 in parallel therewith, chamber 155, passageways 189, 161, 80 and passageways and ports in the service valve device 11 it being understood that these passageways and ports correspond to ports and passageways in the service valve device 7 of the brake control valve device 1 shown in hereinbefore-mentioned U.S. Pat. No. 3,232,678 through which fluid under pressure may flow from the brake cylinder 7 shown in this patent to atmosphere.

With the release of all fluid under pressure from the brake cylinder 2 (FIG. 1C), the brakes on the car will be completely released.

Furthermore, the emergency reservoir 3 and the auxiliary reservoir 4 will now be charged from the brake pipe 1 to the normal fully charged train brake pipe pressure.

DESCRIPTION - FIG. 2

Figure 2:
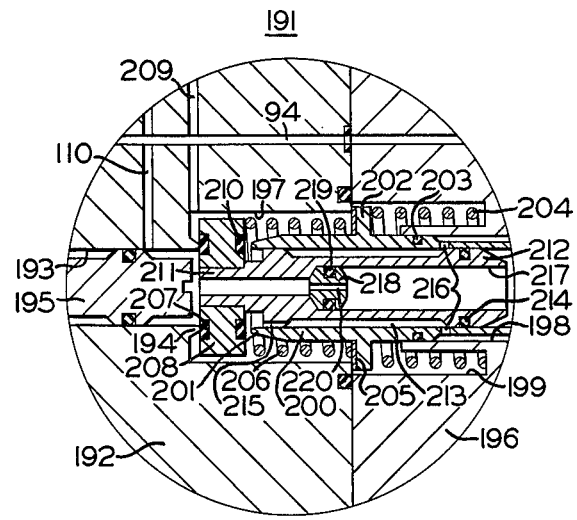
FIG. 2 is a partial diagrammatic view, in section, of an emergency valve portion constructed in accordance with a second embodiment of the invention.

In FIG. 2 of the drawings, there is shown a partial diagrammatic view, in vertical cross section, of a portion of a continual quick service valve device 191 constructed in accordance with a second embodiment of the invention. According to this second embodiment of the invention, the other elements comprising the continual quick service valve device 191 are identical to those of the continual quick service valve device 34 shown in FIG. 1B.

Moreover, it should be understood that this continual quick service valve device 191 may be substituted for the continual quick service valve 34 to form a brake control valve device 5.

According to this second embodiment of the invention, the continual quick service valve device 191 shown in FIG. 2 differs from the continual quick service valve device 34 shown in FIG. 1B in that the valve stem 81 having the valve 127 on one end, the valve member 100, cylindrical member 112, exhaust valve member 103, bushing 108 and casing sections 23 and 24 shown in FIG. 1B are replaced by structure now to be described.

The casing section 23 is replaced by a casing section 192 having a bore 193 at the right-hand end of which is formed a valve seat 194 that corresponds to the valve seat 101 shown in FIG. 1B. Slidably mounted in the bore 193 is a valve stem 195 that replaces the valve stem 81. Only a portion of the valve stem 195 is shown in FIG. 1, it being understood, however, that the remainder of this valve stem 195 is identical to the valve stem 81 shown in FIG. 1B.

The casing section 24 shown in FIG. 1B is replaced by a casing section 196, a portion of which is shown in FIG. 2. This casing 196 is secured to the casing section 192 by any suitable means (not shown). It should be understood that these casing sections 192 and 196 embody therein the emergency accelerated release valve mechanism 35, the emergency accelerated release check valve device 36 and the spillover check valve device 37 shown in FIG. 1B and also the same passageway shown in the casing sections 23 and 24 but not appearing in FIG. 2.

As shown in FIG. 2, the casing section 192 is provided with a counterbore 197 that is coaxial with the bore 193, and the casing section 196 is provided with a bore 198 and a coaxial counterbore 199, it being noted that the bore 198 is coaxial with the bore 193 and has a larger diameter.

Disposed within the counterbore 197 is an annular valve seat member 200 that has formed on its left-hand end an annular valve seat 201 that corresponds to the valve 102 shown in FIG. 1B. This valve seat member 200 is further provided intermediate its ends with an out-turned flange 202 and a peripheral annular groove in which is disposed an O-ring seal 203 that forms a seal with the wall surface of the bore 198.

As shown in FIG. 2, a spring 204 is interposed between the bottom of the counterbore 199 and the out-turned flange 202 which biases this flange 202 against an annular spring seat 205 that in turn is biased against the casing section 192 at the right-hand end of the counterbore 197 therein. This spring seat 205 in turn supports one end of a spring 206 that is normally effective to bias an annular seating surface 207, of some suitable material such as, for example, rubber bonded to the left-hand side of an annular poppet-type valve member 208, into seating engagement with the valve seat 194.

It will be noted from FIG. 2 that the inside diameter of the annular seating surface 207 is of such size that this resilient surface is not engaged by the valve stem 195 to form a seal therewith when this stem is shifted in the direction of the right hand, as viewed in FIG. 2, to unseat this seating surface 207 from the annular valve seat 194 to establish a communication between the passageway 110 that is connected to the quick service volume chamber 31 (FIG. 1A) and a passageway 209 (FIG. 2) that at one end opens into the left-hand end of the counterbore 197. This passageway 209 extends through the casing section 192 and at the other end opens at the exterior surface of this casing section 192, it being noted that this passageway 209 constitutes an exhaust passageway that corresponds to the exhaust passageway 111 shown in FIG. 1B.

As shown in FIG. 2, the right-hand side of the annular valve member 208 has a resilient annular seating surface 210 bonded thereto in coaxial relation to the valve seat 201 so as to engage this valve seat 201 when the valve member 208 is shifted in the direction of the right hand by the valve stem 195 from the position shown in which the annular seating surface 207 engages the valve seat 194 to a second position in which the annular seating surface 210 engages the valve seat 201.

As further shown in FIG. 2, the annular valve member 208 is press-fitted on a hub 211 provided therefor on the left-hand end of a hollow cylindrical member 212 that is slidably mounted in the annular valve seat member 200. This member 212 corresponds to the hollow cylindrical member 112 shown in FIG. 1B in that it is provided with an elongated peripheral annular groove 213 that is located between an O-ring seal 214 carried thereon in a peripheral annular groove provided therefor and a fluted collar 215 that is integral with this member 212. This groove 213 and fluted collar 215 cooperate with a pair of ports 216 provided in the cylindrical member 212 to establish a communication through which fluid under pressure may flow from the interior of the bore 198 to atmosphere via the ports 216, groove 213, fluted collar 215, past valve seat 201, counterbore 197 and exhaust passageway 209. Though not shown in FIG. 2, it should be understood that the hereinbefore-mentioned one end of the passageway 117 opens at the wall surface of the bore 198. Consequently, when the diaphragm valve 32 (FIG. 1A) is unseated from the valve seat 67 in the manner hereinbefore explained, fluid under pressure is released from the chamber 91 (FIG. 1B) and the quick action chamber 69 (FIG. 1C) to atmosphere via passageways 93 and 68, choke 70, chamber 66, past valve seat 67, passageway 117, bore 198, ports 216, groove 213, fluted collar 215, past valve seat 201, counterbore 197 and passageway 209.

It may be noted from FIG. 2 that the hollow cylindrical member 212 is provided with a counterbore 217 in which is disposed a cylindrical member 218 that has formed thereon a peripheral annular groove in which is disposed an O-ring seal 219 that forms a seal with the wall surface of the counterbore 217.

Extending longitudinally through the cylindrical member 218 is a bore 220 the diameter of which is the same as that of the cross bore 131 shown in FIG. 1B. Consequently, this bore 220 constitutes a choke that is the same size as the choke provided by the cross bore 131.

Since in this second embodiment of the invention, all of the fluid under pressure supplied from the train brake pipe to the quick service volume chamber 31 (FIG. 1A) must flow through this choke 120 and the passageway 110, it is apparent that the time required to charge this quick service volume chamber 31 in this second embodiment of the invention is somewhat longer than the time required to charge this chamber 31 in the first embodiment of the invention via the choke 131 (Fib. 1B) and past the valve 127 which is unseated from the resilient seating surface on the left-hand side of the valve member 100. It is apparent that the choke 131 and the unseated valve 127 provide two parallel paths through which fluid under pressure can flow from the train brake pipe to the quick service volume chamber 31 whereas the choke 220 provides a single path for this flow of fluid under pressure to this quick service volume chamber 31 in the brake control valve device that constitutes the second embodiment of the invention.

Except as noted above, the construction and operation of the brake control valve device constituting the second embodiment of the invention and embodying a continual quick service valve device constructed in accordance with FIG. 2 is the same as that of the brake control valve device 5 shown in FIGS. 1A, 1B and 1C of the drawings.

DESCRIPTION - FIG. 3

FIG. 3 of the drawings shows an inshot valve device 221 that may be used with the brake control valve device 5 shown in FIGS. 1A, 1B and 1C in place of the inshot valve device 38 shown in FIG. 1B to thereby constitute a third embodiment of the invention.

The inshot valve device 221 shown in FIG. 3 comprises two casing sections 222 and 223 between which is clamped the outer periphery of a diaphragm 224 constructed of some suitable resilient material such as, for example, rubber. These casing sections are secured together by any suitable means (not shown), and the casing section 223 is provided with a flat face 225 that is adapted to abut the flat face 167 (FIG. 1B) on the casing section 23 to enable the casing section 223 to be secured to the casing section 23 by any suitable means (not shown).

The inshot valve device 221 further comprises a disc valve 226 mounted in a chamber 227 and yieldingly urged by means of a spring 228 toward an annular valve seat 229. This valve seat 229 is formed at one end of a bore 230 that at its opposite end opens into a chamber 231 that is connected by a passageway 232 to the passageway 160 (FIG. B) in the casing section 23, it being remembered that this passageway 160 is connected by the correspondingly numbered pipe to the brake cylinder 2, as shown in FIG. 1C.

The chamber 227 (FIG. 3) is connected by a passageway 233 to the passageway 80 (FIG. 1B) and by a choke 234 (FIG. 3) to the chamber 231.

As shown in FIG. 3, the right-hand side of the diaphragm 224 is bonded to one side of a disc or plate 235. Secured to the opposite side of this plate 235 is one end of a fluted stem 236 that extends through the bore 230 and into the chamber 227 where the other end abuts the valve 226.

The diaphragm 224 and the casing section 222 cooperate to form a chamber 237 in which is disposed a first spring 238 that is interposed between the left-hand side of the diaphragm 224 and a shoulder 239 formed on the casing section 222.

In order to effect the supply of fluid under pressure at brake cylinder pressure to the chamber 237 from the passageway 232, a third casing section 240 is secured by any suitable means (not shown) to the casing section 222, there being an annular resilient valve seat 241 interposed between these casing sections 240 and 222 and a pair of passageways 242 and 243 extending through the casing section 240. One end of the passageway 242 opens at the wall surface of a bottomed bore 244 provided in the casing section 240 and the other end is in alignment with one end of a short passageway 245 that extends through the casing section 223 and at its other end opens into the passageway 232 intermediate the ends thereof. Since the passageway 232 is connected to the brake cylinder 2 (FIG. 1C) by the passageway and pipe 160, it is apparent that some of the fluid under pressure supplied to the passageway 232 will flow to the chamber 237 via the passageway 242, bottomed bore 244, an elongated peripheral annular groove 246 provided on a piston member 247 slidably mounted in the bottomed bore 244, and past the valve seat 241 as an annular cup-shaped valve 248 that is integral with the piston member 247 at the right-hand end of the groove 246 is unseated from this valve seat 241 by fluid under pressure supplied from the brake pipe 1 to the left-hand end of the piston member 247 through the hereinbeforementioned passageway 243 that at one end opens into the left-hand end of the bottomed bore 244 and at its other end is in alignment with one end of a short passageway 249 that extends through the casing section 223 and its opposite end is in alignment with that end of the passageway 182 (FIG. 1B) that opens at the flat face 167 on the casing section 23, it being remembered that fluid under pressure is supplied to this passageway 182 from the brake pipe 1 in the manner hereinbefore described in connection with the first embodiment of the invention.

As shown in FIG. 3, a spring 250 is interposed between the diaphragm 224 and the cup-shaped valve 248 to effect seating of this valve 248 on the valve seat 241 when all train brake pipe pressure is released from the left-end of the piston member 247 at the time an emergency brake application is effected.

OPERATION - FIG. 3

As long as fluid under pressure is supplied from the train brake pipe to the bottomed bore 244 via the passageway 243, the fluid under pressure acting on the left-hand end of the piston member 247 is effective to maintain valve 248 unseated from valve seat 241 so that when a service brake application is effected, brake cylinder pressure is supplied to the chambers 231 and 237 on the respective opposite sides of the diaphragm 224. Consequently, the springs 239 and 250, the combined strength of which is greater than that of the spring 228, maintain the valve 226 unseated from the valve seat 227 to enable fluid under pressure to flow from the passageway 233 to the passageway 232 and the brake cylinder 2 (FIG. 1C) through the bore 230 (FIG. 3) and the choke 234 in parallel thereby enabling a rapid buildup of pressure in the brake cylinder 2 (FIG. 1C) until equalization of pressure between the auxiliary reservoir 4 and the brake cylinder 2 occurs.

Whenever an emergency brake application is effected, all fluid under pressure is released from the train brake pipe and, therefore, the left-hand end of the piston member 247 (FIG. 3). When all fluid under pressure is thus released from the left-hand end of the piston member 247, the spring 250 is rendered effective to shift piston member 247 and the cup-shaped valve 248 in the direction of the left hand, as viewed in FIG. 3, until this valve 248 is seated on the resilient valve seat 241.

With the valve 248 seated on the valve seat 241, fluid under pressure cannot flow from the chamber 231 to the chamber 237 via the passageways 232, 245 and 242.

It should be noted that the spring 239 is stronger than the spring 228 so that this spring 239 is effective to unseat valve 226 from the valve seat 229.

Consequently, fluid under pressure will flow from the passageway 233 to the chamber 231 and passageway 232 and thence to the brake cylinder 2 (FIG. 1C) via the bore 230 (FIG. 3) and the choke 234 in parallel until the pressure in the chamber 231 is increased sufficiently to overcome the yielding resistance of the spring 239. As the pressure in the chamber 231 continues to increase, the diaphragm 224 will be deflected in the direction of the left hand, as viewed in FIG. 3, against the yielding resistance of the springs 239 and 250.

As the diaphragm 224 is deflected in the direction of the left hand, the spring 228 is rendered effective to shift the valve 226 in the direction of the left hand until this valve 226 is seated on the valve seat 229 to cut off flow from the chamber 227 to the chamber 231 via the bore 230. The strength of the springs 239 and 250 may be so selected that the valve 226 is seated on the valve seat 229 when the pressure in the chamber 231 reaches a certain chosen value, such as, for example, fifteen pounds per square inch. This seating of the valve 226 on the valve seat 229 cuts off the rapid flow of fluid under pressure to the brake cylinder 2 by way of the annular valve seat 229.

With the valve 226 seated on the valve seat 229, fluid under pressure continues to flow from the passageway 233 to the brake cylinder 2 via the choke 234, chamber 231, passageway 232 and passageway and pipe 160, the choke 234 thus forming a by-pass communication around the valve 226 which is now seated on the valve seat 229. The choke 234 provides for the second stage of increase in brake cylinder pressure at a slower rate. The pressure in the brake cylinder 2 will now continue to build up at this slower rate determined by the size of the choke 234 until equalization of the pressure in the auxiliary reservoir 4, emergency reservoir 3 and brake cylinder 2 occurs.

From the foregoing, it is apparent that when the inshot valve device 221 shown in FIG. 3 replaces the inshot valve device 38 shown in FIG. 1B, the emergency valve device 12 of the brake control valve device 5 provides a two-stage buildup of pressure in the brake cylinder 2 the same as is the case when the inshot valve device 38 is used.

It may be noted from FIGS. 3 and 1B that the piston member 247 and cup-shaped valve 248 that is integral therewith will require less machining than that required for the production of the spring seat member 172 and the hollow valve seat member 178 (FIG. 1B).

It may be further noted that the casing sections 222, 223 and 240 require more complicated coring in the manufacture of these casing sections than is required in the manufacture of the casing sections 166 and 24.

DESCRIPTION - FIGS. 1A, 1D AND 1C

When the lower edge of FIG. 1A is placed above the upper edge of FIG. 1D and the right-hand edge of FIG. 1D is placed along side of the left-hand side of FIG. 1C, there is shown an improved freight car fluid-pressure-operated brake apparatus that constitutes a fourth embodiment of the invention. According to this fourth embodiment of the invention, a brake control valve device 251 is connected to the brake pipe 1, the brake cylinder 2, the emergency reservoir 3, and the auxiliary reservoir 4 in the same manner as the brake control valve device 5 which is an element of the brake apparatus constituting the first embodiment of the invention.

The brake control valve device 251 is the same in construction as the brake control valve device 5 in that it comprises the pipe bracket 8, and the service or triple valve device or portion 11 but differs from the brake control valve device 5 in that it includes a novel emergency valve device 252.

The novel emergency valve device 252 is shown in FIG. 1D and is the same in construction as the emergency valve device 12 of the brake control valve device 5 in that it comprises the same emergency piston 28, vent valve device 29, high pressure valve device 30, quick service volume chamber 31, and diaphragm-type quick action chamber breather valve 32, these elements being shown in FIG. 1A of the drawings. This emergency valve device 252 differs from the emergency valve device 12 in that it further comprises a continual quick service valve device 253 (FIG. 1D) and an inshot valve device 254 that are somewhat different in construction and operation from the continual quick service valve device 33 and inshot valve device 38 shown in FIG. 1B of the drawings.

According to this fourth embodiment of the invention, the continual quick service valve device 253 shown in FIG. 1D differs from the continual quick service valve device 34 shown in FIG. 1B in that the delivery passageway 80 from the high pressure valve device 30 (FIG. 1A) is connected to the inshot valve device 254 (FIG. 1D) rather than to the passageway in the pipe bracket 8 (FIG. 1C) to which fluid under pressure is supplied from the auxiliary reservoir 4 whenever a service brake application is effected in the manner described in the hereinbefore-mentioned U.S. Pat. No. 3,232,678.

It should be understood that the continual quick service valve device 253 shown in FIG. 1D comprises all of the other elements of the continual quick service valve device 34 shown in FIG. 1B. Accordingly, like reference numerals have been used to designate the structure of the continual quick service valve device 253 shown in FIG. 1D which is identical to that shown in FIG. 1B. Only such features of the structure and operation of the fourth embodiment of the invention shown in FIGS. 1A, 1D and 1C which differ from that of the first embodiment shown in FIGS. 1A, 1B and 1C will be hereinafter described.

As shown in FIG. 1D, the inshot valve device 254 comprises three casing sections 255, 256 and 257 and two diaphragms 258 and 259 constructed of some suitable resilient material such as, for example, rubber, the outer periphery of the diaphragm 258 being clamped between the casing sections 255 and 256, and the outer periphery of the diaphragm 259 being clamped between the casing sections 256 and 257 when these casing sections 255, 256 and 257 are secured together by any suitable means (not shown). Each of these casing sections 255, 256 and 257 is provided with a flat face that is adapted to abut the flat face 167 on the casing section 23 to enable these casing sections 255, 256 and 257 to be secured to the casing section 23 by any suitable means (not shown).

The inshot valve device 254 further comprises a disc valve 260 mounted in a chamber 261 and yieldingly urged by means of a first spring 262 toward an annular valve seat 263. This valve seat 263 is formed at one end of a bore 264 that at its opposite end opens into a chamber 265 that is connected by a passageway 266 to the passageway 160 (FIG. C) in the pipe bracket 8, it being remembered that this passageway 160 is connected by the correspondingly numbered pipe to the brake cylinder 2, as shown in FIG. 1C.

The chamber 261 is connected by a passageway 267 to the passageway in the pipe bracket 8 (FIG. 1C) to which fluid under pressure is supplied from the auxiliary reservoir 4 whenever a service brake application is effected in the manner described in the hereinbefore-mentioned U.S. Pat. No. 3,232,678.

Extending through the bore 264 is a fluted stem 268 one end of which abuts the right-hand side of the diaphragm 259 and the other end of which abuts the left-hand side of the disc valve 260.

The diaphragm 259 and the casing section 256 cooperate to form a chamber 269 in which is disposed a second spring 270 that is stronger than the spring 262 and is interposed between the left-hand side of the diaphragm 259 and a shoulder 271 formed on the casing section 256.

As shown in FIG. 1D, opening into the passageway 267 intermediate the ends thereof is one end of a passageway 272 that at its other end opens into the chamber 265 via a choke 273. Consequently, while the valve 260 is unseated from the valve seat 263, fluid under pressure may flow from the passageway 267 to the chamber 265 via the choke 273 and the fluted stem 268 in parallel.

As is also shown in FIG. 1D, the diaphragm 258 is normally biased against a first annular valve seat 274 by a spring 275 interposed between the right-hand side of this diaphragm 258 and a shoulder 276 formed on the casing section 256. While the spring 275 thus biases the diaphragm 258 against the annular valve seat 274, this diaphragm 258 cooperates with the casing section 255 to form on the inside of the annular valve seat 274 a chamber 277 and on the outside of this valve seat 274 a chamber 278. Opening into the chamber 277 is one end of a passageway 279 that extends through the casing sections 255, 256 and 257 and at its other end opens into the passageway 267 intermediate the ends thereof, and opening into the chamber 278 is the delivery passageway 80 of the high pressure valve device 30 (FIG. 1A).

As shown in FIG. 1D, a passageway 280 in the casing section 256 opens at one end into the chamber 269 and at the other end into a chamber 281 that is within an annular valve seat 282 formed on the casing section 256. Opening into a chamber 283 on the outside of the annular valve seat 282 is one end of a passageway 284 that extends through the casing sections 256 and 255 and at its opposite end opens into the passageway 279 intermediate the ends thereof. A choke 285 disposed in this passageway 284 and carried by the casing section 256 serves to control the rate of flow of fluid under pressure through this passageway from the passageway 279 to the chambers 283 and 281 and thence to the chamber 269 via the passageway 280.

OPERATION - FIGS. 1A, 1D AND 1C

The operation of the fourth embodiment of the invention shown in FIGS. 1A, 1D and 1C is the same as that of the operation of the first embodiment shown in FIGS. 1A, 1B and 1C except as explained below.

Since the high pressure valve device 30 (FIG. 1A) is operated to effect the supply of fluid under pressure from the emergency reservoir 3 (FIG. 1C) to the passageway 80 (FIG. 1D) only when an emergency brake application is effected, it is apparent that the chamber 278 is void of fluid under pressure at the time a service brake application is effected. While the chamber 278 is void of fluid under pressure, the spring 275 is effective to unseat the diaphragm 258 from the valve seat 282 and bias the left-hand side of this diaphragm 258 against the annular valve seat 274.

As hereinbefore stated, the spring 270 is stronger than the spring 262. Therefore, this spring 270 is effective, via the diaphragm 259 and fluted stem 268, to unseat the valve 260 from its seat 263. Consequently, when the service valve device 11 operates in the manner explained in U.S. Pat. No. 3,232,678 to effect the supply of fluid under pressure from the auxiliary reservoir 4 (FIG. 1C) to the passageway 267 (FIG. 1D), some of this fluid under pressure supplied to the passageway 267 flows through the passageway 279 to the chamber 277 within the annular valve seat 274.

Moreover, as is apparent from FIG. 1D, fluid under pressure will flow from the passageway 279 to the chambers 283 and 281 via the passageway 284 and the choke 285 at a rate determined by the size of this choke.

It will be noted that the area within the annular valve seat 274 is considerably less than the effective area of the right-hand side of the diaphragm 258. Accordingly, it will be apparent that the fluid under pressure supplied through the choke 285 to the chambers 283 and 281 and acting on the effective area of the right-hand side of the diaphragm 258 will establish a fluid pressure force that, together with the force of the spring 275, will maintain the diaphragm 258 seated against the annular valve seat 274 so that the fluid under pressure supplied to the chambers 283 and 281 flows therefrom to the chamber 269 on the left-hand side of the diaphragm 259 via the passageway 80.

It is further apparent from FIG. 1D that some of the fluid under pressure supplied to the passageway 267 flows through the passageway 272 and the choke 273 to the chamber 265 on the right-hand side of the diaphragm 259 and also past the unseated valve 260 and through the bore 273 to this chamber 265.

From the foregoing, it is apparent that fluid under pressure is supplied from the passageway 267 to the chambers 269 and 265 on the respective opposite sides of the diaphragm 259.

It should be understood that the size of the chokes 285 and 273 and the area of the passageways provided by the flutes on the valve stem 268 are such that the rate of buildup of pressure in the chambers 269 and 265 is such that the spring 270 is able, via the diaphragm 259 and the fluted stem 268, to maintain the valve 260 unseated from the valve seat 263 against the resistance of the spring 262 that is lighter than the spring 270, as hereinbefore pointed out. Therefore, fluid under pressure will flow from the passageway 267 to the passageway 266 and thence to the brake cylinder 2 (FIG. 1C) via the passageway and pipe 160 through the bore 264 and the choke 273 in parallel thereby enabling a rapid buildup of pressure in the brake cylinder 2 (FIG. 1C) until equalization of pressure between the auxiliary reservoir 4 and the brake cylinder 2 occurs.

Whenever an emergency brake application is effected, the high pressure valve device 30 (FIG. 1A) is operated in the manner hereinbefore described to effect the supply of fluid under pressure from the emergency reservoir 3 (FIG. 1C) to the passageway 80 (FIG. 1D) that opens into the chamber 278 on the left-hand sise of the diaphragm 258 and on the outside of the annular valve seat 274. Fluid under pressure is also supplied to the chambers 277, 283 and 281 in the manner hereinbefore described, it being noted that the flow of fluid under pressure to the chambers 283 and 281 is at a restricted rate via the choke 285 whereas the flow to the chambers 277 and 278 is at an unrestricted rate since there are no chokes in the passageways 279 and 80. Consequently, the rate of buildup of pressure in the chambers 277 and 278 will be faster than that in the chambers 283 and 281.

It is apparent that his faster buildup of pressure in the chambers 277 and 278 quickly establishes a differential fluid pressure force that effects unseating of the diaphragm 258 from the valve seat 274 and thereafter the seating of this diaphragm on the valve seat 282.

Upon the seating of the diaphragm 258 on the valve seat 282, flow of fluid under pressure from the passageway 284 to the chamber 269 on the left-hand side of the diaphragm 259 is cut off. Consequently, there is no buildup of pressure in the chambers 269 and 281 when an emergency brake application is effected.

It may be noted that, with diaphragm 258 unseated from the valve seat 274 and seated on the valve seat 282, the fluid under pressure supplied through the passageway 279 acts on the effective area of the entire left-hand side of the diaphragm 258 which establishes a fluid pressure force that acts in the direction of the right hand and quickly exceeds the force of the spring 275 which force acts in the direction of the left hand.

Therefore, fluid under pressure will flow from the passageway 267 to the chamber 265 and passageway 266 and thence to the brake cylinder 2 (FIG. 1C) via the bore 264 and choke 273 in parallel until the pressure in the chamber 265 is increased sufficiently to overcome the yielding resistance of the spring 270. As the pressure in the chamber 265 continues to increase, the diaphragm 259 will be deflected in the direction of the left-hand, as viewed in FIG. 1D, against the yielding resistance of the spring 270.

As the diaphragm 259 is deflected in the direction of the left-hand, the spring 262 is rendered effective to shift the valve 260 in the direction of the left hand until this valve 260 is seated on the valve seat 263 to cut off flow from the chamber 261 to the chamber 265 via the bore 264. The strength of the spring 270 may be so selected that the valve 260 is seated on the valve seat 263 when the pressure in the chamber 265 reaches a certain chosen value, such as, for example, fifteen pounds per square inch. This seating of the valve 260 on the valve seat 263 cuts off the rapid flow of fluid under pressure to the brake cylinder 2 by way of the annular valve seat 263.

With the valve 260 seated on the valve seat 263, fluid under pressure continues to flow from the passageway 267 to the brake cylinder 2 via the choke 273, chamber 265, passageway 266 and passageway and pipe 160, the choke 273 thus forming a bypass communication around the valve 260 which is now seated on the valve seat 263. The choke 273 provides for the second stage of increase in brake cylinder pressure at a slower rate. The pressure in the brake cylinder 2 will now continue to build up at this slower rate determined by the size of the choke 273 until equalization of the pressure in the auxiliary reservoir 4, emergency reservoir 3 and brake cylinder 2 occurs.

From the foregoing, it is apparent that when the emergency valve device 252 is provided with the inshot valve device 254 shown in FIG. 1D, this emergency valve device 252 of the brake control valve device 251 provides a two-stage buildup of pressure in the brake cylinder 2 the same as the inshot valve device 38 (FIG. 1B) of the brake control valve device 5.

It may be noted from FIG. 1D that the inshot valve device 254 uses two diaphragms 258 and 259 that require no machining as do the piston member 247 and cup-shaped valve 248 (FIG. 3) and spring seat member 172 (FIG. 1B) and the hollow valve seat member 178.

DESCRIPTION - FIGS. 1E and 1C

When the right-hand edge of FIG. 1E is placed along side of the left-hand side of FIG. 1C, there is shown an improved freight car fluid-pressure-operated brake apparatus that constitutes a fifth embodiment of the invention. According to this fifth embodiment of the invention, a brake control valve device 186 is connected to the brake pipe 1, the brake cylinder 2, the emergency reservoir 3, and the auxiliary reservoir 4 in the same manner as the brake control valve device 5 which is an element of the brake apparatus constituting the first embodiment of the invention.

The brake control valve device 286 is the same in construction as the brake control valve device 5 in that it comprises the pipe bracket 8, and the service or triple valve device or portion 11 but differs from the brake control valve device 5 in that it includes a novel emergency valve device 287.

The novel emergency valve device 287 is shown in FIG. 1E and comprises an upper casing section 288, a center casing section 289 and a lower casing section 290 that are secured together by any suitable means (not shown). Formed on the right-hand end of the center casing section 289 and the lower casing section 290 are a pair of coplanar flat faces 291 and 292 that abut the gasket 26 (FIG. 1C) when these casing sections are secured to the pipe bracket 8 by any suitable means (not shown).

As shown in FIG. 1E of the drawings, the emergency valve device 287 comprises an emergency brake pipe vent valve device 293, a high pressure valve device 294, a diaphragm-type quick action chamber breather valve 295, a continual quick service valve device 296 for controlling in cycles the flow of fluid under pressure from the brake pipe 1 to a quick service volume chamber 297, which is formed by the cooperative relationship of the center casing section 289 and the lower side of the diaphragm-type valve 295, and the subsequent release of this fluid under pressure from this chamber 297 to atmosphere, an emergency accelerated release valve device 298 operative to connect the brake cylinder 2 and the auxiliary reservoir 4 to the brake pipe 1 when effecting a brake release subsequent to an emergency brake application, an emergency accelerated release check valve device 299, a spill-over check valve device 300, an inshot valve device 301, a pilot valve device 302 for controlling the operation of the vent valve device 293 and an emergency piston 303 for operating the valve devices 294, 296, 298 and 302.

The emergency brake pipe vent valve device 293 comprises an annular diaphragm 304, the outer periphery of which is clamped between the center casing section 289 and the lower casing section 290. Extending through the lower casing section 290 is a bore 305 of large diameter that has an annular valve seat 306 formed at its upper end against which the diaphragm 304 is normally biased by a spring 307 that is interposed between the diaphragm 304 and the center casing section 289. The diaphragm 304 and casing sections 289 and 290 cooperate to form on the respective opposite sides of the diaphragm 304 a pair of chambers 308 and 309.

Opening into the chamber 308 is one end of a passageway 310 that extends through the casing sections 289 and 290 to the pilot valve device 302, and opening into the chamber 309 is one end of a passageway 311 that extends through the casing section 290 to the gasket 26 (FIG. 1C) where it registers with a port in this gasket. This port in the gasket 26 establishes a communication between the passageway 311 (FIG. 1E) in the casing section 290 and the passageway 48 (FIG. 1C) to which fluid under pressure is supplied from the brake pipe 1, as hereinbefore stated. Accordingly, it is apparent that fluid under pressure is supplied from the brake pipe 1 to the passageway 311 (FIG. 1E) and thence to the chamber 309. Simultaneously, fluid under pressure is supplied from the brake pipe 1 to the passageway 310 and chamber 308 in a manner hereinafter made apparent. Consequently, the spring 307 is normally effective to maintain diaphragm 304 seated on valve seat 306 to prevent flow of fluid under pressure from chamber 309 to the bore 305 that is open to atmosphere via a dished circular shield 312.

The shield 312 is preferably formed of a resilient material, such as rubber, and is held in place, in which its outer periphery rests against a conical surface 313 on an insect excluder device 314, by any suitable means, such as, for example, a revet 315 that extends through a bore in this insect excluder device 314.

The high pressure valve device 294 comprises a poppet-type valve 316 that is disposed in a counterbore 317 that is coaxial with a bore 318 which extends from the upper end of this counterbore 317 through the casing section 289 to a chamber 319 below the piston 303.

The poppet valve 316 has formed integral with the upper side thereof a valve stem 320 that extends through the bore 318 into the chamber 319. The lower side of the valve 316 has a resilient disc 321 bonded thereto and an annular resilient member 322 is disposed about the stem 320 and bonded to the upper side of this valve 316.

A hollow internally fluted cylindrical valve seat member 323 is slidably mounted in the counterbore 317. This valve seat member 323 has an annular valve seat 324 formed at its upper end and an out-turned flange 325 in the form of a snap ring secured to its lower end.

This out-turned flange 325 is disposed in a counterbore 326 that extends into the lower casing section 290 from the upper end thereof and has an outside diameter that is greater than the inside diameter of a bushing 237 that is press-fitted into the above-mentioned counterbore 317 that is coaxial therewith prior to securing the snap ring 325 to the valve seat member 323. A spring 328 disposed in the counterbore 317 is interposed between the upper end of the bushing 327 and an out-turned flange 329 formed on the upper end of valve seat member 323 to normally bias the out-turned flange 325 against the lower end of the bushing 327.

It will be noted from FIG. 1E that the length of the hollow cylindrical valve seat member 323 is such that, when the spring 328 biases the out-turned flange 325 against the lower end of bushing 327 and a spring 330 biases the upper end of a plunger 331 against the disc 321, the valve 316 is shifted upward until the disc 322 on the upper side of this valve 316 is seated on an annular valve seat 332 formed at the lower end of the bore 318 and the disc 321 is unseated from the valve seat 324.

Referring to FIG. 1E of the drawings, it will be seen that one end of a passageway 333 opens at the wall surface of the counterbore 317 at a location that is above the valve seat 324 on the valve seat member 323 while the spring 328 biases the flange 325 on the lower end of this member 323 against the lower end of the bushing 327. This passageway 333 extends through the casing section 289 and at its other end opens at the flat face 291 thereon. This other end of the passageway 333 is in alignment with one of the ports in the ported gasket 26 (FIG. 1C). This port in the gasket 26 establishes a communication between the passageway 333 (FIG. 1E) in the casing section 289 and a passageway in the pipe bracket 8 (FIG. 1C) that corresponds to the passageway 72 shown in the hereinbefore-mentioned U.S. Pat. No. 3,232,678. As explained in this patent, fluid under pressure is supplied from the auxiliary reservoir 2 (in the patent) to this passageway whenever a service brake application is effected. Accordingly, it is apparent that, likewise, fluid under pressure is supplied from the auxiliary reservoir 4 (FIG. 1C) to the passageway 333 (FIG. 1E) and thence through the interior of counterbore 317 and the flutes in the valve seat member 323 to a chamber 334 in casing section 290 by operation of the service portion 11 (FIG. 1C) in response to a reduction of the pressure in the brake pipe 1 at a service rate.

As shown in FIGS. 1E and 1C opening into the bore 318 is one end of a passageway 335 that extends through the casing section 289 and at its outer end is in alignment with a port in the gasket 26 (FIG. C) which port establishes a communication between this passageway 335 and the passageway 76 that is connected by the correspondingly numbered pipe to the emergency reservoir 3.

As shown in FIG. 1E, a spring 336 disposed in the quick service volume chamber 297 is interposed between the center casing section 289 and the diaphragm-type valve 295 to normally bias the upper side of this valve 295 against an annular valve seat 337 formed on the upper casing section 288 so that, while the diaphragm-type valve 295 is seated on this seat 337, this valve 295 cooperates with the casing section 289 to form within this annular valve seat 337 a chamber 338 and on the outside of this seat 337 a chamber 339. Opening into the chamber 338 within the annular valve seat 337 via a choke 340 is one end of a passageway 341 that extends through the upper casing section 288 and at its other end opens into a chamber 342 formed by the cooperative relationship of the emergency piston 303 and this casing section 288. The chamber 339 without the annular valve seat 337 is normally open to atmosphere in a manner hereinafter made apparent.

The continual quick service valve device 296 is operated by the emergency piston 303 that comprises an annular diaphragm 343 the outer periphery of which is clamped between the upper casing section 288 and the center casing section 289. The inner periphery of this diaphragm 343 is clamped between a diaphragm follower 344 and a diaphragm follower plate 345. A quick action chamber charging choke 346 carried by the diaphragm follower 344 controls charging of the chamber 342 from the chamber 319. In actual practice, or, in other words, in heretofore constructed railway freight car brake control valve devices, this quick action chamber charging choke 346 has a diameter of .0200 inch.

Referring now to FIG. 1E, it will be seen that the continual quick service valve device 296 comprises a valve stem 347 that is slidably mounted in a bore 348 formed in the center casing section 298. Near its upper end, the valve stem 347 is provided with a shoulder 349 against which rests the diaphragm follower 344 and with external screw threads for receiving a nut 350 which serves, when tightened, to force the diaphragm follower 344 against the shoulder 349 on the stem 347 and thus clamp the inner periphery of the diaphragm 343 between this follower 344 and the diaphragm follower plate 345.

As shown in FIG. 1E, opening into the chamber 342 above the diaphragm 343 is one end of a passageway 351 that extends through the casing sections 288 and 289 to the flat face 291 on the casing section 289 and at its other end is in alignment with that one of the ports in the gasket 26 (FIG. 1C) that establishes a communication between this passageway 351 and the passageway 69 in the pipe bracket 8 that opens into the quick action chamber 69 in this pipe bracket 8.

Opening into the chamber 319 (FIG. 1E) below the diaphragm 343 is one end of a passageway 352 that extends through the center casing 289 to the flat face 291 thereon and at its other end is in alignment with that one of the ports in the gasket 26 (FIG. 1C) that opens into the chamber 98 in the pipe bracket 8. Fluid under pressure is supplied from the brake pipe 1 to the chamber 98 in the manner hereinbefore described. Therefore, this fluid under pressure flows from the chamber 98 to the chamber 319 (FIG. 1E) via the passageway 352.

As shown in FIG. 1E, the continual quick service valve device 296 further comprises a poppet-type valve member 353 that has a resilient annular member constructed of some suitable resilient material such as, for example, rubber bonded to each side thereof to provide seating surfaces for engagement with an upper valve seat 354 that is formed at the lower end of the bore 348 or a lower valve seat 355 formed at the upper end of a hollow internally-fluted cylindrical valve seat member 356 that is slidably mounted in a counterbore 357 that extends into the center casing section 289 from the lower end thereof and is coaxial with the bore 348 therein. This valve seat member 356 has an out-turned flange 358 adjacent its upper end and an out-turned flange in the form of a snap ring 359 secured to its lower end.

This snap ring or out-turned flange 359 is disposed in a counterbore 360 that is coaxial with the counterbore 357 and extends into the lower casing section 290 from the upper end thereof. This counterbore 360 is also coaxial with a bore 361 that extends through the lower casing section 290 to a second coaxial counterbore 362 therein that has an annular valve seat 363 formed at the lower end thereof. The outside diameter of this out-turned flange 359 is greater than the inside diameter of a bushing 364 that is press-fitted into the counterbore 357 in the center casing section 289 subsequent to inserting this valve seat member 356 into this counterbore 357 and prior to securing the out-turned flange or snap ring 359 to this valve seat member 356.

Moreover, a spring 365 is disposed about the valve seat member 356 prior to the insertion of this valve seat member into the counterbore 357 which spring 365, subsequent to press-fitting the bushing 364 into the counterbore 357 and securing the snap ring 359 to this valve seat member 356, is effective to bias this snap ring or out-turned flange 359 against the lower end of the bushing 364.

It will be noted from FIG. 1E that the valve seat member 356 just below the out-turned flange 358 is provided with a crossbore of small diameter which constitutes a quick action chamber blowdown choke 366 and in actual practice, as in heretofore constructed railway freight car brake control valve devices, has a diameter of 0.0200 inch.

It will be further noted from FIG. 1E that each of the valve seat members 323 and 356 is provided with a peripheral annular groove in which is disposed an O-ring seal 367 that forms a seal with the respective bushing 327 and 364 to prevent leakage of fluid under pressure to the chamber 334 and the interior of the counterbore 360 while the resilient disc 321 carried by the poppet valve 316 is seated on the valve seat 324 and the resilient annular member bonded to the lower side of the poppet valve 353 is seated on the valve seat 355.

As shown in FIG. 1E, an annular valve 368 is formed at the lower end of a bottomed bore 369 that extends into the valve stem 347 from the lower end thereof.

The resilient annular member bonded to the upper side of the valve member 353 is biased against the valve seat 354 by a spring 370. This spring 370 is disposed within a counterbore 371 in a hollow cylindrical member 372 that is formed integral with this valve member 353 and is interposed between the upper end of this counterbore 371 and a hollow valve element 373 to which is bonded a resilient annular disc 374. This resilient disc 374 is biased against the valve seat 363 by a spring 375 interposed between the valve element 373 and a screw-threaded plug member 376 that has screw-threaded engagement with a screw-threaded bore 377 in the lower casing section 290.

As further shown in FIG. 1E, a spring 378 disposed within the bottomed bore 369 is interposed between the upper end of this bottomed bore 369 and the valve member 353 to normally effect unseating of the annular valve 368 from the resilient annular member bonded to the upper side of the valve member 353.

Moreover, the valve stem 347 is provided with a crossbore 379 of small diameter so as to constitute a choke that at one end opens into the bottomed bore 369 and at the other end at the peripheral surface of a portion 380 of reduced diameter of the valve stem 347, it being noted that the annular valve 368 is formed at the lower end of this portion 380 of the valve stem 347. The diameter of the crossbore 379, which constitutes a choke, as stated above, may be, for example, 0.031 inch.

As shown in FIG. 1E, opening at the wall surface of the bore 348 adjacent the lower end thereof is one end of a passageway 381 that extends through the center casing section 289 and at its other end opens into the hereinbefore-mentioned quick service volume chamber 297.

As further shown in FIG. 1E, opening at the wall surface of the counterbore 360 at the lower end thereof is one end of a passageway 382 that extends through the three casing sections 290, 289, and 288 and at its other end opens into the hereinbefore mentioned chamber 339 that is on the outside of the annular valve seat 337.

Moreover, opening at the wall surface of the counterbore 357 adjacent the upper end thereof is one end of a passageway 383 that extends through the center casing section 289 and the lower casing section 290 and at its other end opens at the wall surface of the hereinbefore-mentioned bore 305.

From the foregoing, it will be seen that while the resilient annular member bonded to the upper side of the valve member 353 is biased against the upper valve seat 354 so that the resilient member bonded to the lower side of valve member 353 is unseated from the lower valve seat 355, as shown in FIG. 1E, the chamber 339 on the outside of the annular valve seat 337 is open to atmosphere via passageway 382, counterbore 360, the internal flutes in the cylindrical valve seat member 356, past the valve seat 355, upper end of counterbore 357, passageway 383, bore 305 and past the resilient shield 312 of insect excluder device 314.

The valve stem 347 and the hollow cylindrical member 372 that may have the same diameter as this stem, as shown in FIG. 1E, are provided intermediate their ends with a peripheral annular groove in which is disposed an O-ring seal 384 that forms a seal with the wall surface of the respective one of the bores 348 and 361 to prevent leakage of fluid under pressure from one end of the respective bore to the other.

The emergency accelerated release valve device 298, which is separate from the continual quick service valve device 296 in this fifth embodiment of the invention, is operated by the emergency piston 303 as is the continual quick service valve device 296. This emergency accelerated release valve device 298 comprises a resilient annular valve seat 385 that is bonded to the upper end of a cylindrical member 386 that is disposed within the largest of three counterbores 387, 388 and 389 that are coaxial with a bore 390 that extends through the center casing section 289 and is disposed in spaced-apart parallel relation to the bore 348 in this casing section. A cup-shaped piston valve member 391 is disposed in the counterbore 389 and biased against the seat 385 by a spring 392 that is interposed between this valve member 391 and the upper end of the counterbore 389. The piston valve member 391 is provided with a peripheral annular groove in which is disposed an O-ring seal 393 that forms a seal with the wall surface of the counterbore 389 to prevent leakage of fluid under pressure from the counterbore 388 to the upper end of this counterbore 389.

As shown in FIG. 1E, the cup-shaped valve member 391 is provided with a bore 394 through which extends a valve operating stem 395 that has a head 396 which is formed integral with the lower end thereof. The valve stem 395 also extends through the bore 390 and near its upper end is provided with a shoulder 397 against which rests the diaphragm follower 344 and with external screw threads for receiving a nut 398 which serves, when tightened, to force the diaphragm follower 344 against the shoulder 397 and thereby operatively connect the valve stem 395 to the emergency piston 303.

The emergency accelerated release check valve device 299 comprises an annular valve seat 399 formed on the lower casing section 290 and a disc valve 400. This disc valve 400 is disposed in a counterbore 401 that is coaxial with a bottomed bore 402 that extends into the cylindrical member 386 and is normally biased into contact with the valve seat 399 by a spring 403 which is interposed between the valve 400 and the upper end of the bottomed bore 402.

Opening within the annular valve seat 399 is one end of a passageway 404 that extends through the lower casing section 290 and at its opposite end opens into the hereinbefore-mentioned chamber 334. Consequently, the spring 403 normally biases the valve 400 against its seat 399 to cut off flow from the passageway 404 to the interior of the bottomed bore 402 into which opens one end of a passageway 405. This passageway 405 extends through the member 386 and the center casing section 289 and at its other end opens at the wall surface of the counterbore 388.

As shown in FIG. 1E, the spillover check valve device 300 comprises an annular valve seat 406 formed on the upper casing section 288 and a disc valve 407. This disc valve 407 is disposed in a chamber 408 formed between the casing sections 288 and 289 and is normally biased against the valve seat 406 by a spring 409 that is interposed between the valve 407 and the casing section 289.

Opening within the annular valve seat 406 is one end of a short passageway 410 that extends through the upper casing section 288 and at its other end opens into the passageway 351 intermediate the ends thereof, and opening into the chamber 408 is one end of a passageway 411 that extends through the center casing section 289 and at its other end opens into the passageway 335 that is connected to the emergency reservoir 3 (FIG. 1C) in the manner hereinbefore explained.

From the foregoing, it is apparent that the spring 409 (FIG. 1C) is normally effective to bias the disc valve 407 against its seat 406 to cut off flow from the passageway 410 to the chamber 408.

The inshot valve device 301 shown in FIG. 1E comprises a disc valve 412 mounted in a chamber 413 and yieldingly urged by means of a spring 414 toward and annular valve seat 415. This valve seat 415 is formed at one end of a bore 416 that at its opposite end opens into a chamber 417 that is constantly connected to the brake cylinder 2 (FIG. 1C) by a passageway 418 (FIG. 1E) and the passageway and correspondingly numbered pipe 160 (FIG. 1C).

The chamber 413 (FIG. 1E) is connected by a passageway 419 to the passageway 333. A choke 420 and short passageway 421 connect the chambers 413 and 417.

A diaphragm 422 constructed of, for example, rubber, has its outside periphery clamped between the center casing section 289 and the lower casing section 290. This abutment 422 cooperates with the casing sections 289 and 290 to form on its respective opposite sides a chamber 423 and the above-mentioned chamber 417. Opening into the chamber 423 is one end of a passageway 424 that extends through the casing sections 289 and 290 and at its other end opens into the hereinbefore-mentioned chamber 334.

As shown in FIG. 1E, a spring 424a is disposed in the chamber 423 and interposed between the diaphragm 422 and the center casing section 289. This spring 424a is stronger than the spring 414 and, therefore, is normally effective, via the diaphragm 422 and a fluted stem 425, to effect unseating of the disc valve 412 from the valve seat 415.

The pilot valve device 302 shown in FIG. 1E comprises, in addition to the hereinbefore-mentioned valve seat 363, hollow valve element 373 having bonded thereto the resilient disc 374 that is normally biased by the spring 375 against the valve seat 363, and the spring 370 interposed between the upper end of the counterbore 371 and the valve element 373, an annular valve 426 formed on the hollow valve element 372 at the lower end of the counterbore 371. This valve 426 is normally unseated from the resilient disc 374 by the spring 370.

As shown in FIG. 1E, the hollow valve element 373 is slidably mounted in a bottomed bore 427 provided therefor in the plug 376, the spring 375 being disposed within this bottomed bore 427 into which opens one end of a passageway 428. This passageway 428 extends through the casing sections 290 and 289 and at its opposite end opens into the passageway 352 to which fluid under pressure is supplied from the brake pipe 1 in the manner hereinbefore described.

As further shown in FIG. 1E, opening at the wall surface of the counterbore 362 is one end of a passageway 429 that extends through the lower casing section 290 and at its other end opens at the wall surface of a bottomed bore 430 in which is slidably mounted the hereinbefore-mentioned plunger 331 that is provided with a peripheral annular groove in which is disposed an O-ring seal 431 that forms a seal with the wall surface of this bottomed bore 430 to prevent leakage of fluid under pressure from this bottomed bore 430 into the chamber 334.

Also opening at the wall surface of the counterbore 362 is the other end of the hereinbefore-mentioned passageway 310 the one end of which opens into the chamber 308, as hereinbefore stated.

Since fluid under pressure is supplied from the brake pipe 1 to the passageway 352, as hereinbefore stated, some of this fluid under pressure will flow to the interior of the counterbore 362 via the passageway 428, bottomed bore 427 and hollow valve element 373.

Fluid under pressure supplied to the counterbore 362 will flow therefrom to: (1) the quick service volume chamber 297 via the counterbore 371, the hollow cylindrical member 372, bore 348, past annular valve 368 and through choke 379 in parallel therewith, and passageway 381, (2) the bottomed bore 430 via the passageway 429, and (3) the chamber 308 via the passageway 310.

From the foregoing, it is apparent that the quick service volume chamber 297 is charged to the pressure normally carried in the brake pipe 1.

Moreover, fluid under pressure is supplied from the brake pipe 1 to the bottomed bore 430 so that brake pipe pressure acting on the lower end of plunger 331 is effective to assist the spring 330 to transmit a force through this plunger 331 to the resilient disc 321 on the poppet valve 316 to normally maintain this disc 321 unseated from the valve seat 324 and the resilient disc 322 on the upper side of valve 316 seated on the valve seat 332 to prevent flow of fluid under pressure from the passageway 335 that is connected to the emergency reservoir 3 (FIG. 1C) to the passageway 333 (FIG. 1E) that is connected to the brake cylinder 2 (FIG. 1C).

Since fluid under pressure is supplied from the brake pipe 1 to the chamber 308 (FIG. 1E) via the passageway 310 and to the chamber 309 via the passageway 311, the pressure in these chambers is the same as that in the brake pipe 1. Therefore, the spring 307 is effective to maintain the diaphragm 304 seated on the seat 306 to prevent flow from the chamber 309 to atmosphere to cause an emergency brake application.

Referring to FIG. 1E, it will be noted that upper casing section 288 is provided with a bore 432 that is coaxial with the bore 348 in the casing section 289 and three coaxial counterbores 433, 434 and 435 this latter counterbore 435 being provided with internal screw threads. An O-ring seal 436 is retained in the counterbore 434 by a screw-threaded plug 437 having screw-threaded engagement with the screw-threaded counterbore 435, and a cup-shaped stepped piston 438 slidably mounted in the counterbore 433 and bore 432 is normally biased against a shoulder 439 formed by the lower end of the counterbore 433 by a spring 440 interposed between this piston 438 and the plug 437. This spring 440 and piston 438 yieldingly resists upward deflection of the diaphragm 343 in a manner hereinafter described.

It will be noted from FIG. 1E that the valve stem 320 adjacent the disc 321 on the upper side of the poppet valve 316 is provided with an elongated peripheral annular groove 441 and a peripheral annular groove in which is disposed an O-ring seal 442 that forms a seal with the bore 318 to prevent leakage of fluid under pressure from the groove 441 to the chamber 319.

Moreover, it will be noted from FIG. 1E that the hollow valve element 373 is provided with a peripheral annular groove in which is disposed an O-ring seal 443 that forms a seal with the wall surface of the bottomed bore 427 to prevent leakage of fluid under pressure from this bottomed bore 427 into a counterbore 444 coaxial therewith. Opening at the wall surface of the counterbore 444 is one end of a short passageway 445 that extends through the lower casing section 290 and at its opposite end opens into the hereinbefore-mentioned passageway 383 intermediate the ends thereof.

OPERATION - FIGS. 1E AND 1C

Initial Charging

Let it be assumed that a railway freight car provided with the brake control valve device 286 shown in FIGS. 1E and 1C of the drawings has been coupled into a train of cars, and that a handle of an engineer's brake valve device (not shown) located on the locomotive coupled to the head end of the train is in its release position. Therefore, while the handle of the engineer's brake valve device is in its release position, the relay valve device of this brake valve device will effect the supply of fluid under pressure to the train brake pipe and therefore to the brake pipe 1 to charge the train brake pipe to a preselected normal charge value which, for example, may be seventy pounds per square inch.

Fluid under pressure supplied to the brake pipe 1 (FIG. 1C) will flow via the branch pipe 7 and combined cut-out cock and dirt collector 6 to the brake control valve device 286 (FIGS. 1E and 1C) to cause the service valve portion 11 of this control valve device 286 to operate in the usual well-known manner of railway freight car brake control valves to effect a release of fluid under pressure from the brake cylinder 2 thereby releasing the brakes on the car and to charge the emergency reservoir 3 and auxiliary reservoir 4 to the pressure carried in the brake pipe 1.

Fluid under pressure supplied to the brake pipe 1 will flow therefrom through the branch pipe 7 and combined cut-out cock and dirt collector 6 to the passageway 48 in the pipe bracket 8 and thence from this passageway 48 to: (1) the chamber 309 (FIG. 1E) via the ported gasket 36 (FIG. 1C) and the passageway 311 (FIG. 1E), and (2) the chamber 308 via the passageway 185 (FIG. 1C), chamber 186, strainer 187, passageway 99, chamber 98, passageways 352 (FIG. 1E) and 428, bottomed bore 427, hollow valve element 373, counterbore 362, and passageway 310. With fluid under pressure thus supplied from the brake pipe 1 to the chambers 308 and 309 on the opposite sides of the diaphragm 304, the spring 307 is effective to maintain diaphragm 304 seated on the seat 306 to prevent flow of fluid under pressure from the chamber 309 to atmosphere at an emergency rate.

Fluid under pressure also flows from the passageway 352 to the chamber 319.

Moreover, fluid under pressure flows from the counterbore 362 to: (1) the quick service volume chamber 297 via the counterbore 371, hollow cylindrical valve element 372, past unseated valve 368 to the bore 348, and also to this bore 348 via the bottomed bore 369 and the choke 379, and thence from the bore 348 through the passageway 381.

Furthermore, fluid under pressure will flow from the chamber 319 at a restricted rate determined by the size of the choke 346 to: (1) the quick action chamber 69 (FIG. 1C) via this choke 346, a chamber 342, passageway 351 (FIG. 1E) and passageway 69 (FIG. 1C).

It will be noted that the chamber 342 (FIG. 1E) is charged with fluid under pressure via the choke 346 whereas no choke restricts the flow of fluid under pressure from the brake pipe 1 to the chamber 319. Consequently, the pressure in the chamber 319 will build up faster than in the chamber 342 so that a differential fluid pressure force is established which acts in an upward direction to thereby deflect the diaphragm 343 upward and shift the diaphragm follower plate 345, nut 350, valve stems 347 and 395 and piston 438 upward against the yielding resistance of the spring 440.

As the valve stem 395 is thus shifted upward, its head 396 will first abut the cup-shaped piston valve member 391 on the lower end of which is a valve 446 and thereafter unseat this valve 446 from its seat 385.

Assuming that no fluid under pressure is present in the brake cylinder 2 (FIG. 1C) at the time the freight car is coupled into the train, there is no flow of fluid under pressure from this brake cylinder 2 to the brake pipe 1 upon unseating of the valve 446 from the seat 385.

Subsequent to the pressure in the chamber 319 reaching the normal fully charged brake pipe pressure, the continued flow of fluid under pressure to the chamber 342 via the choke 346 will cause the pressure in this chamber 342 to increase to that in the chamber 319.

As the pressure in the chamber 342 is thus increased to that in the chamber 319, the spring 440 is rendered effective to shift the diaphragm 343, stems 347 and 395, diaphragm follower 344 and diaphragm follower plate 345 downward until they are returned to the position in which they are shown in FIG. 1E.

As the diaphragm follower plate 345 is thus shifted downward, the spring 392 is rendered effective to seat valve 446 on its seat 385.

SERVICE APPLICATION

A service application of the brakes is initiated by effecting a gradual reduction in brake pipe pressure at a service rate in the usual well-known manner. The service portion 11 (FIG. 1C) of the brake control valve device 286 will operate in the usual manner of the service portion of heretofore known railway freight car brake control valve devices to effect the supply of fluid under pressure from the auxiliary reservoir 4 to the brake cylinder 2 to cause a service brake application of the freight car provided with this control valve device 286.

As the pressure in the brake pipe 1 is reduced at a service rate, the pressure in the chamber 319 below the diaphragm 343 will be correspondingly reduced at a service rate.

Since the choke 346 restricts the rate of flow of fluid under pressure from the chamber 342 and 69 (FIG. 1C) to the brake pipe 1, it is apparent that as the pressure in the chamber 319 below the diaphragm 343 is thus reduced faster than the pressure in the chamber 342 above the diaphragm 343, a differential fluid pressure force is established which acts in a downward direction to deflect diaphragm 343 downward and thereby effect shifting of stems 347 and 395, diaphragm follower 344 and follower plate 345 downward.

As the diaphragm follower 344, plate 344 and stem 347 are thus shifted downward, the valve 368 on the lower end of the stem 347 is shifted into engagement with the resilient annular member on the upper side of the valve member 353 to close communication between the brake pipe 1 and the quick service volume chamber 297 except for the restricted communication provided by the choke 379.

As the diaphragm 343 is further deflected in a downward direction, the stem 347, valve 368, and valve member 353 are shifted in the downward direction in response to the increasing differential fluid pressure force. Therefore, the resilient annular member on the upper side of the valve member 353 is unseated from the valve seat 354.

While the resilient annular members on the upper and lower sides of valve member 353 are unseated from the spaced-apart valve seat 354 and 355, fluid under pressure will flow from the quick service volume chamber 297 to atmosphere via passageway 381, interior of bore 347, past valve seat 354, counterbore 357, passageway 383, bore 305 and past resilient shield 312.

Since the volume of the chamber 297 is comparatively small, the pressure therein is quickly reduced so that quick action chamber pressure, which is present in the chamber 338 and acting on the upper side of the diaphragm-type valve 295 unseats this valve 295 from the annular valve seat 337.

Upon the unseating of diaphragm valve 295 from the valve seat 337, fluid under pressure will flow from the chamber 342 at the upper side of the diaphragm 343 and the quick action chamber 69 (FIG. 1C) to atmosphere via passageways 351 and 341, choke 340, chambers 338 and 339, passageway 382, counterbore 360, the internal flutes in the valve member 356, past valve seat 355, counterbore 357, passageway 383, bore 305 and past resilient shield 312.

It will be noted that at this time fluid under pressure will flow from the brake pipe 1 (FIG. 1C) to atmosphere via branch pipe 7, combined cut-out cock and dirt collector 6, passageways 48 and 185, chamber 186, strainer 187, passageway 99, chamber 98, passageways 352 (FIG. 1E) and 428, bottomed bore 427, hollow valve element 373, counterbores 362 and 371, hollow cylindrical valve member 372, bottomed bore 369, choke 379, bore 348, past valve seat 354, counterbore 357, passageway 383, bore 305 and past shield 312 at a rate determined by the size of the choke 379. This flow of fluid under pressure from the brake pipe 1 to atmosphere at a rate determined by the size of the choke 379 provides an initial quick service reduction of the pressure in the brake pipe 1.

The diameter of the choke 340 should be the same as the diameter of the choke 70 (FIG. 1A) which, as hereinbefore stated, is 0.0760 inch which size is such that fluid under pressure can now flow from the chamber 342 and the quick action chamber 69 (FIG. 1C) to atmosphere via the pathway described above faster than fluid under pressure can flow from the chamber 319 and the train brake pipe to atmosphere via the relay valve device of the engineer's brake valve device on the locomotive and from the brake pipe 1 to atmosphere via the choke 379 in the manner described above. Consequently, when the pressure in the chamber 342 becomes less than that in the chamber 319, a differential fluid pressure force will be established on the diaphragm 343 to deflect this diaphragm in an upward direction, as viewed in FIG. 1E. Accordingly, this deflection of the diaphragm 343 in an upward direction is effective to shift the valve stem 347 and valve 368 in this same direction. As the valve 368 is thus shifted in an upward direction, the spring 370 will shift the valve member 353 in this direction until the resilient annular member on the upper side thereof engages the valve seat 354, it being noted that this annular member also engages the valve 368.

Upon this resilient annular member on the valve member 353 engaging the valve seat 354, the flow of fluid under pressure from the chamber 319 to atmosphere via the passageway 383 is cut off, it being noted that the flow of fluid under pressure from the quick service volume chamber 297 to atmosphere past the valve seat 354 is likewise cut off.

It will be noted that fluid under pressure will continue to flow from the chamber 342 to atmosphere via passageway 341, choke 340, chambers 338 and 339, passageway 382, counterbore 360, the internal flutes in the valve seat member 356, past valve seat 355, counterbore 357, passageway 383, bore 305 and past shield 312.

Accordingly, the pressure in the chamber 342 and the quick action chamber 69 (FIG. 1C) will quickly be reduced below the pressure in the chamber 319. Therefore, this pressure in the chamber 319 will establish a differential fluid pressure force which acts in an upward direction, as viewed in FIG. 1E, on the diaphragm 343.

It is apparent that this differential fluid pressure force deflects the diaphragm 343 in an upward direction which in turn shifts the valve stem 347 and valve 368 in the same direction so that this valve 368 is moved out of seating engagement with the resilient member on the upper side of the valve member 353.

Upon this unseating of the valve 368 from the resilient member on the upper side of the valve member 353, fluid under pressure will flow from the brake pipe 1 to the quick service volume chamber 297 via the pathway hereinbefore described, it being noted that this pathway includes flow past the unseated valve 368 and through the choke 379 in parallel notwithstanding that fluid under pressure is being released from the train brake pipe to atmosphere via the relay valve device of the engineer's brake valve device on the locomotive. Accordingly, the quick service volume chamber 297 will be recharged to the reduced pressure remaining in the train brake pipe.

Fluid under pressure is now flowing from the chamber 342 to atmosphere via choke 340 and the chambers 338 and 339, as stated above. Consequently, the supply of fluid under pressure from the brake pipe 1 to the quick service volume chamber 297 to recharge this chamber will quickly establish a differential fluid pressure force that acts in an upward direction on the diaphragm valve 295 to deflect it into engagement with the valve seat 337.

This engagement of the diaphragm valve 295 with the valve seat 337 cuts off further flow from the chamber 342 and the quick action chamber 69 (FIG. 1C) to atmosphere. Consequently, the remaining fluid under pressure in these chambers is trapped therein.

Since the handle of the engineer's brake valve device is still in the position in its application zone to which it was moved by the locomotive engineer, fluid under pressure continues to be released from the train brake pipe to atmosphere via the relay valve device of the engineer's brake valve device. Consequently, fluid under pressure will continue to flow from the chamber 319 to atmosphere via the passageway 352, chamber 98 (FIG. 1C) passageway 99, strainer 187, chamber 186, passageways 185 and 48, combined cut-out cock and dirt collector 6, branch pipe 7, the train brake pipe and the relay valve device of the engineer's brake device.

When the flow of fluid under pressure from the chamber 319 to atmosphere via the relay valve device of the engineer's brake valve device has reduced the pressure in this chamber 319 to a value less than the trapped pressure in the chamber 342 and the quick action chamber 69 (FIG. 1C), the continual quick service valve device 296 and the diaphragm valve 295 will operate to repeat the cycle hereinbefore described to vent the fluid under pressure in the quick service volume chamber 297 to atmosphere, thereafter release fluid under pressure from the chamber 342 and the quick action chamber 69 (FIG. 1C) to atmosphere until the pressure in these chambers is reduced sufficiently to cause the continual quick service valve device 296 to effect the recharge of the quick service volume chamber 297 with fluid under pressure from the train brake pipe which fluid under pressure in chamber 297 is effective to cause reseating of the diaphragm valve 295 on the valve seat 337 thereby trapping fluid under pressure in the chamber 342 and the quick action chamber 69 (FIG. 1C) to cause the continual quick service valve device 296 and diaphragm valve 295 to again repeat the above-described cycle of operation. Therefore, the continual quick service valve device 296 and the diaphragm valve 295 operate in successive repeated cycles to release fluid under pressure from the chambers 297, 69 and 342 to atmosphere and recharge the chamber 297 from the train brake pipe during each cycle so long as fluid under pressure is being released from the train brake pipe via the relay valve device of the engineer's brake valve device located on the locomotive, as in the brake apparatus constituting the first embodiment of the invention.

It should be noted that the repeated recharge of the quick service volume chamber 297 from the train brake pipe effects a local quick service reduction of the pressure in the train brake pipe, and that the repeated release of fluid under pressure from the chamber 342 and the quick action chamber 69 (FIG. 1C) to atmosphere causes the pressure in these chambers to be reduced substantially simultaneously as the pressure in the train brake pipe is reduced when a service brake application is effected, whereby the emergency piston 303 is rendered ineffective to operate the vent valve pilot valve device 302 to cause the emergency brake pipe vent valve device 293 to effect an undesired emergency brake application.

It should be understood that when the relay valve device of the engineer's brake valve device has released fluid under pressure from the train brake pipe to atmosphere until the pressure in the train brake pipe has been reduced to a value corresponding to the position in its application zone to which the handle of the brake valve device was moved by the engineer, this relay valve device will cease to release fluid under pressure from the train brake pipe and, therefore, from the chamber 319.

Moreover, it should be further understood that upon the termination of the release of fluid under pressure from the chamber 319 and the train brake pipe to atmosphere via the relay valve device of the engineer's brake valve device, the continual quick service valve device 296 and the diaphragm valve 295 will cease to operate in cycles to release fluid under pressure from the train brake pipe to atmosphere to cause a local quick service reduction of the pressure of the fluid in the train brake pipe.

SERVICE LAP

When the relay valve device of the engineer's brake valve device terminates the release of fluid under pressure from the train brake pipe, the release of fluid under pressure from the chamber 319 is likewise terminated, whereupon the continual quick service valve device 296 and the diaphragm valve 295 cease to operate in successive cycles to release fluid under pressure from the train brake pipe 1 and the quick action chamber 69 (FIG. 1C) to atmosphere.

Furthermore, when the release of fluid under pressure from the train brake pipe, and, therefore, the brake pipe 1 (FIG. 1C) is terminated, the service valve device 11 will move to a lap position to cut off flow of fluid under pressure from the auxiliary reservoir 4 to the brake cylinder 2.

EMERGENCY APPLICATION

To effect an emergency application of the brakes, fluid under pressure is suddenly vented at a rapid rate from the brake pipe 1. Upon this rapid rate of reduction of pressure in the brake pipe 1, the service valve device 11 will operate to supply fluid under pressure from the auxiliary reservoir 4 (FIG. 1C) to the passageway 333 (FIG. 1E).

Moreover, the emergency valve device 287 operates in the manner explained above to release fluid under pressure from the chamber 342 and quick action chamber 69 (FIG. 1C) to atmosphere via the choke 340. This rate of release of fluid under pressure from the chamber 342 above the diaphragm 343 is less than the emergency rate of release of fluid under pressure from the chamber 319 below this diaphragm 343 via the brake pipe 1.

Therefore, it is apparent that a differential of pressure is quickly established on the diaphragm 343 which acts in a downward direction to deflect this diaphragm 343 downward and thereby shift the stem 347 and valve 368 downward until valve 368 engages the resilient member on the upper side of the valve member 353.

As the stem 347 is thus further shifted in a downward direction, this stem 347 will effect unseating of the resilient member on the upper side of valve member 353 from its seat 354 and thereafter the seating of the resilient member on the lower side of valve member 353 on the lower valve seat 355.

Upon this seating of the resilient member on the lower side of valve member 353 on the lower valve seat 355, fluid under pressure will no longer flow from the chamber 342 above the diaphragm 342 and the quick action chamber 69 (FIG. 1C) to atmosphere via passageways 351 (FIG. 1E) and 341, choke 340 and the pathway described above. However, fluid under pressure may flow from the chamber 342 and the quick action chamber 69 (FIG. 1C) to atmosphere at a restricted rate via passageways 351 and 341, choke 340, chambers 338 and 339, passageway 382, counterbore 360, the internal flutes and quick action chamber blowdown choke 366 in valve seat member 356, counterbore 357, passageway 383, bore 305 and past shield 312. This restricted flow of fluid under pressure from the chamber 342 to atmosphere via the chokes 340 and 366 in series causes a buildup of pressure in this chamber that deflects the diaphragm 343 further downward so that the valve stem 347, valve 368, valve member 353, hollow cylindrical member 372 and valve 426 on the lower end thereof are shifted downward whereby the valve 426 is first seated on resilient disc 374 after which this disc is unseated from the seat 363 as the hollow valve element 373 is shifted downward against the yielding resistance of the spring 375.

Upon the unseating of the disc 374 from its seat 363, fluid under pressure in the chamber 308 will flow to atmosphere via passageway 310, counterbore 362, past valve seat 363, passageways 445, 383 and bore 305 and past shield 312.

Brake pipe pressure which is present in the chamber 309 will now unseat diaphragm 304 from valve seat 306.

Fluid under pressure will now flow from the brake pipe 1 and the train brake pipe to atmosphere via the bore 305 of large diameter and past shield 312 for the purpose of serially transmitting an emergency rate of reduction of pressure in the train brake pipe extending through the train in the usual wellknown manner.

It will be noted from FIG. 1E that when the diaphragm 343 has been deflected downward a chosen amount, the diaphragm follower 344 will abut the upper end of valve stem 320. Further downward deflection of the diaphragm 343 will cause the diaphragm follower 344 to shift the valve stem 320 downward to unseat the resilient disc 322 from the valve seat 332.

Fluid under pressure supplied to the passageway 335 from the emergency reservoir 3 (FIG. 1C) will now flow past the valve seat 332 (FIG. 1E) to the counterbore 317 and thence to the passageway 333.

Fluid under pressure thus supplied to the passageway 333 from the emergency reservoir 3 (FIG. 1C) combines with that supplied to this passageway 333 from the auxiliary reservoir 4 by operation of the service valve device 11 and flows therefrom to the passageway 419 and thence to a pressure chamber (not shown) within the brake cylinder 2 (FIG. 1C) via the chamber 413 (FIG. 1E) past the valve 412 which is unseated from the valve seat 415, the bore 416, chamber 417, passageway 418, and passageway and pipe 160 (FIG. 1C).

The fluid under pressure thus supplied to the pressure chamber within cylinder 2 will act on one side of the piston (not shown) therein and move this piston outward against the yielding resistance of the brake cylinder release spring (not shown) that acts on the other side of this piston. As this piston is thus moved, it increases the volume of the pressure chamber to which fluid under pressure is being supplied from the chamber 417. It is apparent that this increasing volume of the pressure chamber within the brake cylinder 2 (FIG. 1C) retards the rate of build up of pressure in this pressure chamber of increasing volume and also in the chamber 417 (FIG 1E) below the diaphragm 422.

Subsequent to the valve stem 320 unseating the resilient disc 322 from the valve seat 332, further downward shifting of the valve stem 320 will effect downward shifting of the valve 316 and plunger 331 against the yielding resistance of the spring 330 until the resilient disc 321 bonded to the lower side of the valve 316 is seated on the valve seat 324. This seating of disc 321 on the valve seat 324 cuts off flow of fluid under pressure from the counterbore 317 to the chamber 423 so that no fluid under pressure can flow from the emergency reservoir 4 (FIG. 1C) to the chamber 423 (FIG. 1E) above diaphragm 422 of the inshot valve device 301. Therefore, as the pressure in the chamber 417 increases, the diaphragm 422 will be deflected upward against the yielding resistance of the spring 424a thereby allowing the spring 414 to shift the disc valve 412 upward.

The strength of the spring 424a may be so selected that when the pressure in the chamber 417 is increased to a chosen value, such as, for example, fifteen pounds per square inch, the diaphragm 422 will be deflected in an upward direction against the yielding resistance of the spring 424a whereupon the spring 414 will shift the valve 412 into seating engagement with the valve seat 415 thereby closing off the rapid flow of fluid under pressure to the brake cylinder 2 by way of the annular valve seat 415. With the valve 412 thus seated on valve seat 415, fluid under pressure continues to flow from the passageway 419 to the brake cylinder 2 (FIG. 1C) via the chamber 413, choke 420, chamber 417, passageway 418 and passageway and pipe 160 (FIG. 1C), the choke 420 forming a by-pass communication around the valve 412 which is now seated on the valve seat 415. The choke 420 provides for the second stage of increase in brake cylinder pressure at a slower rate. The pressure in the brake cylinder 2 will now continue to build up at this slower rate determined by the size of the choke 420 until equalization of the pressures in the auxiliary reservoir 4, emergency reservoir 3 and brake cylinder 2 occurs.

From the foregoing, it is apparent that the emergency valve device 287 of the brake control valve device 286 provides a two-stage buildup of pressure in the brake cylinder 2.

Since fluid under pressure is supplied from both the auxiliary reservoir 4 and the emergency reservoir 3 to the brake cylinder 2 when an emergency brake application is effected, it is apparent that a higher pressure is obtained in the brake cylinder 2 than is the case when a service brake application is effected.

It will be noted that the fluid under pressure trapped in the chamber 342 above the diaphragm 343 and in the quick action chamber 69 (FIG. 1C) upon the seating of the resilient member on the lower side of the valve member 353 on the valve seat 355 in the manner described above may flow to atmosphere via the passageways 351 and 341, choke 340, chambers 338 and 339, passageway 382, counterbore 360, internal flutes and choke 366 in valve seat member 356, counterbore 357, passageway 383, bore 305 and past shield 312 at a restricted rate determined by the size of the chokes 340 and 366 in series.

As hereinbefore stated, when an emergency brake application is effected, the diaphragm 304 is unseated from the seat 306. This vent valve diaphragm cannot be reseated on its seat 306 as long as the chamber 308 is open to atmosphere past the resilient disc 374 which is held unseated from its seat 363 by the diaphragm 343 that is subject on its upper side to quick action chamber pressure in the chamber 342.

It being noted, as explained above, that fluid under pressure is being released from the quick action chamber to atmosphere via the chokes 340 and 366 in series, it is apparent that the size of these chokes determine how long the vent valve diaphragm 304 remains unseated from its seat 306. Accordingly, the size of the chokes 340 and 366 is so selected as to prevent the spring 307 from reseating the vent valve diaphragm 304 on its seat 306 until a sufficient period of time has elapsed as is necessary for the emergency brake application to bring the train to a stop.

When all fluid under pressure is released from the quick action chamber 69 (FIG. 1C) and the brake pipe 1 and, therefore, from the chambers 342 and 319, the diaphragm 343, stem 347 and valve 368 thereon and diaphragm valve 295 will be returned to the position shown in FIG. 1E by the resiliency of the diaphragm 343 and the diaphragm valve 295.

RELEASE OF THE BRAKES AFTER AN EMERGENCY APPLICATION

To effect a release of the brakes after an emergency application, fluid under pressure is supplied to the brake pipe 1 from whence it flows to the chamber 319 below the diaphragm 343 and the quick service volume chamber 297 below diaphragm valve 295.

Moreover, fluid under pressure flows from the brake pipe 1 to the chamber 16 (FIG. 1C) above the diaphragm 15 in the service valve device 11 at a restricted rate determined by the size of the choke 190.

It will be noted from FIG. 1E of the drawings that fluid under pressure flows at an unrestricted rate to the chambers 319 and 287 in the emergency valve device 287 since there are no chokes in the passageways 352, 428 and 381.

Furthermore, it will be noted from FIG. 1F that the choke 346 restricts the rate of flow of fluid under pressure from the chamber 319 to the chamber 342, and the quick action chamber 69 (FIG. 1C). Accordingly, it is apparent that the pressure in the chamber 319 below the diaphragm 343 will increase more rapidly than will the pressure in the chamber 342 above this diaphragm.

Moreover, it is apparent that the more rapid rate of increase of pressure in the chamber 319 quickly establishes a fluid pressure differential force which is effective to deflect the diaphragm 343 upward. This upward deflection of the diaphragm 343 lifts the stems 347 and 395 upward and allows the spring 330 to shift plunger 331 and valve 316 upward until resilient disc 322 is seated on its valve seat 332.

As the valve stem 395 is thus shifted upward, the head 396 thereon first abuts the piston valve member 391 and thereafter shifts this piston valve member 391 in an upward direction to unseat valve 446 from valve seat 385 against the yielding resistance of spring 392.

When valve 446 is thus unseated from its seat 385, fluid under pressure will flow from the brake cylinder 2 (FIG. 1C), and the auxiliary reservoir 4 connected thereto via the service valve device 11 which is still in its service application position to the brake pipe 1 via pipe and passageway 160, passageway 418 (FIG. 1E), chamber 417, bore 416, past valve seat 415 and through choke 420, chamber 413, passageways 419 and 333, counterbore 317, past valve seat 324, the internal flutes in valve seat member 323, chamber 334, passageway 404 past valve seat 399, check valve 400 being unseated against the yielding resistance of the spring 403, counterbore 401, bottomed bore 402, passageway 405, counterbore 388, past unseated valve 446, the interior of piston valve member 391, counterbore 389, bore 390, chamber 319, passageway 352, chamber 98 (FIG. 1C), passageway 99, strainer device 187, chamber 186, the passageways 185 and 48 in the pipe bracket 8, combined cut-out cock and dirt collector 6 and branch pipe 7.

The above-mentioned flow of fluid under pressure from the brake cylinder 2 and auxiliary reservoir 4 to the brake pipe 1 accelerates the rate of recharge of the brake pipe. This action naturally occurs first at the head end of the train when the increase in brake pipe pressure is first effected, and the sudden increase in brake pipe pressure on one car causes the emergency valve device on the next car to function in the same manner, so that this back dump operation is rapidly transmitted serially from car to car throughout the length of the train.

It will be noted from FIG. 1E that some of the fluid under pressure supplied from the brake cylinder 2 and auxiliary reservoir 4 to the passageway 352, in the manner described above, flows from the passageway 352 to the quick service volume chamber 297 via the passageway 428, bottomed bore 427, hollow valve element 373, counterbore 362, past unseated valve 426, counterbore 371, hollow cylindrical member 372, past now unseated valve 368 to the bore 348, and also to this bore 348 via the bottomed bore 369 and choke 379, and passageway 381. Some of the fluid under pressure supplied to the counterbore 362 flows therefrom to the chamber 308 via the passageway 310. With fluid under pressure supplied from the brake pipe 1 to the chambers 308 and 309 on the opposite sides of the diaphragm 304, the spring 307 is rendered effective to seat the diaphragm 304 on the valve seat 306 thereby closing the emergency brake pipe vent valve device 293. As the pressure in the quick service volume chamber 247 increases, the diaphragm valve 295 will be deflected upward into seating engagement with the valve seat 337.

It will be noted from FIG. 1E of the drawings that fluid under pressure flows at an unrestricted rate to the chamber 319 in the emergency valve device 287 since there are no chokes in the passageway 352.

Furthermore, it will be noted from FIG. 1E that the choke 346 restricts the rate of flow of fluid under pressure from the chamber 319 to the chamber 342 above the diaphragm 343 and the quick action chamber 69 (FIG. 1C) via passageways 351 and 68 (FIG. 1C). Accordingly, it is apparent that the pressure in the chamber 319 (FIG. 1E) below the diaphragm 343 will increase more rapidly than will the pressure in the chamber 342 above the diaphragm 343.

Accordingly, it is apparent that the more rapid rate of increase of pressure in the chamber 319 quickly establishes a fluid pressure differential force which is effective to deflect the diaphragm 343 in an upward direction, as viewed in FIG. 1E.

Moreover, it is apparent that this upward deflection of the diaphragm 343 is effective to shift the valve stems 347 and 395, diaphragm follower 344 and follower plate 345, and piston 438 in an upward direction against the yielding resistance of the spring 440 until the nut 398 abuts a stop surface 447 on the lower side of upper casing section 288.

As the pressure in the chamber 342 is thus charged to the pressure in the train brake pipe and in the chamber 319 on the opposite side of the diaphragm 343, the spring 440 is rendered effective to shift the diaphragm 343, piston 438 and valve stems 347 and 395 downward which allows the spring 392 to shift the piston member 391 downward until the valve 446 on the lower end thereof engages the valve seat 385.

The elements of the continual quick service valve device 296, the emergency accelerated release valve device 298, the vent valve device 293, the high pressure valve device 294 and diaphragm valve 295 now occupy their release position in which they are shown in FIG. 1E.

As fluid under pressure is supplied to the chamber 16 (FIG. 1C) in the manner described above, the resulting increase in pressure in this chamber 16 will deflect the diaphragm 15 downward to thereby return the graduating valve 19 and the service valve 20 of the service valve device 11 to the position shown. The fluid under pressure now remaining in the brake cylinder 2 will flow to atmosphere via pipe and passageway 160, passageway 418 (FIG. 1E), chamber 417, bore 416, past valve seat 415, valve 412 being unseated from this seat against the yielding resistance of the spring 414, choke 420 in parallel with the bore 416, passageways 419 and 333, and passageways and ports in the service valve device 11 (FIG. 1C) it being understood that these passageways and ports correspond to ports and passageways in the service valve device 7 of the brake control valve device 1 shown in hereinbefore-mentioned U.S. Pat. No. 3,232,678 through which fluid under pressure may flow from the brake cylinder 7 shown in this patent to atmosphere.

With the release of all fluid under pressure from the brake cylinder 2 (FIG. 1C), the brakes on the car will be completely released.

Furthermore, the emergency reservoir 3 and the auxiliary reservoir 4 will now be charged from the brake pipe 1 to the normal fully charged train brake pipe pressure.

It will be noted from FIGS. 1C and 1E that when a service brake application is effected, the fluid under pressure supplied by operation of the service valve device 11 (FIG. 1C) to the passageway 333 (FIG. 1E) flows through the inshot valve device 301 to the brake cylinder 2 (FIG. 1C) via the passageway 419 (FIG. 1E), chamber 413, past valve seat 415, bore 416, chamber 417, passageway 418, and passageway and pipe 160 (FIG. 1C), and some of this fluid under pressure flows to the chamber 423 (FIG. 1E) via the counterbore 317, past valve seat 324, the internal flutes in the hollow valve seat member 323, chamber 334 and passageway 424. With fluid under pressure thus supplied to the chambers 417 and 423, the pressure of the fluid in these chambers is the same so that the spring 424a is effective via the diaphragm 422 and fluted stem 425 to maintain valve 412 unseated from the seat 415 since this spring 424a is stronger than the spring 414, as hereinbefore noted.

If, while a service brake application is in effect and the pressure in the chambers 417 and 423 are equal and, therefore, the same as that in the brake cylinder 2 (FIG. 1C), an emergency brake application is effected, the operation of the emergency valve device 287 (FIG. 1E), in the manner hereinbefore explained, will effect unseating of the resilient disc 322 from the valve seat 332 and the seating of the resilient disc 321 on the valve seat 324. Therefore, fluid at emergency reservoir pressure will flow from the passageway 335 to the chamber 417 below the diaphragm 422 and thence to the brake cylinder 2 via the counterbore 317, passageways 333 and 419, chamber 413 and bore 416, but not to the chamber 423 above the diaphragm 422.

The pressure in the emergency reservoir 3 (FIG. 1C) is higher than the pressure obtained in the chamber 423 (FIG. 1E) and the brake cylinder 2 (FIG. 1C) when a service brake application is effected. Therefore, the fluid under pressure supplied from the emergency reservoir 3 to the chamber 417 (FIG. 1E) and thence to the brake cylinder 2 will increase the pressure in the chamber 417 (FIG. 1E) so that the diaphragm 422 is deflected in an upward direction against the yielding resistance of the spring 424a and the fluid under pressure trapped in the chamber 423.

As the diaphragm 422 is thus deflected upward by the increasing pressure in the chamber 417, the spring 414 is rendered effective to shift the disc valve 412 upward until it is seated on the valve seat 415 thereby cutting off flow of fluid under pressure through the bore 416.

Subsequent to the seating of the valve 412 on the valve seat 415, fluid under pressure flows from the emergency reservoir 3 (FIG. 1C) to the brake cylinder 2 via the choke 420 (FIG. 1E) at a slow rate determined by the size of this choke, thereby providing a two-stage buildup of pressure in the brake cylinder 2 when an emergency brake application is effected subsequent to effecting a service brake application.

Having now described the invention, what I claim as new and desire to secure by Letters Patent, is:

1. For use in a brake apparatus including a brake pipe, an auxiliary reservoir, an emergency reservoir and a quick action chamber each normally charged to a certain chosen pressure, a brake cylinder and a fluid-pressure-operated service valve device, a fluid-pressure-operated emergency valve device operative in conjunction with said service valve device in response to a reduction of the pressure in the brake pipe at an emergency rate to effect the supply of fluid under pressure from said reservoirs to said brake cylinder to cause an emergency brake application, said emergency valve device comprising:

(a) a quick service volume chamber, (b) a continual quick service valve device operable jointly by the pressure in the quick action chamber and in the brake pipe in response to a continuing reduction of the pressure in the brake pipe at a service rate to effect repeated successive release of fluid under pressure from said quick service volume chamber to atmosphere and thereafter recharge of said quick service volume chamber from the brake pipe to the reduced pressure present in the brake pipe, (c) restricted means enabling flow of fluid under pressure from the brake pipe to the quick action chamber to provide for charging the quick action chamber from the brake pipe to the pressure in the brake pipe, and (d) fluid-pressure-operated means operably responsive to the release of fluid under pressure from the brake pipe to atmosphere to so cooperate with said continual quick service valve device and said restricted means as to cause the release of fluid under pressure from the quick action chamber to atmosphere at a rate in excess of said service rate, whereby said continual quick service valve device is rendered sequentially operative to terminate the release of fluid under pressure from said quick service volume chamber to atmosphere and thereafter effect recharging of said quick service volume chamber from the brake pipe to the reduced pressure in the brake pipe, and said fluid-pressure-operated means is rendered sequentially operative in conjunction with said continual quick service valve device to terminate the release of fluid under pressure from the quick action chamber to atmosphere at said rate that is in excess of said service rate to enable the flow of fluid under pressure from the brake pipe to the quick action chamber until the pressure in the quick action chamber is the same as that in the brake pipe.

2. The emergency valve device, as recited in claim 1, further characterized in that said continual quick service valve device comprises:

(a) a first annular valve seat, (b) a second annular valve seat coaxial with and spaced apart from said first annular valve seat, (c) valve means disposed between said first and second valve seats, for, while in engagement with said first valve seat, establishing a communication for the recharge of said quick service volume chamber from the brake pipe, while disengaged from both of said valve seat, establishing a communication through which fluid under pressure can flow from both said quick service volume chamber and the quick action chamber to atmosphere, and, while in engagement with said second valve seat, establishing an unrestricted communication through which fluid under pressure can flow from said quick service volume chamber to atmosphere and a restricted communication through which fluid under pressure can flow from the quick action chamber to atmosphere, and (d) a movable abutment subject on its respective opposite sides to the pressure in the quick action chamber and in the brake pipe and so operably connected to said valve means as to enable shifting of said valve means into engagement with said first valve seat in response to equal pressures in the quick action chamber and in the brake pipe, to cause disengagement of said valve means from both of said valve seats in response to a reduction of the pressure in the brake pipe at said service rate, and to cause engagement of said valve means with said second valve seat in response to a reduction of the pressure in the brake pipe at an emergency rate.

3. The emergency valve device, as recited in claim 1, further characterized in that said emergency valve device further comprises:

(a) a check valve device providing flow of fluid under pressure in the direction from the brake cylinder to the brake pipe, and (b) valve means operable by said continual quick service valve device is response to the supply of fluid under pressure to the brake pipe in the absence of fluid under pressure in the quick action chamber for effecting flow of fluid under pressure from said check valve device to the brake pipe whereby fluid under pressure in the brake cylinder flows to the brake pipe until equalization of pressure between the brake cylinder and the brake pipe occurs.

4. The emergency valve device, as recited in claim 2, further characterized by means whereby said communication established, while said valve means is in engagement with said first valve seat, comprises two parallel communications one of which is restricted, and the other of which may be closed without effecting closing of said restricted communication.

5. The emergency valve device, as recited in claim 2, further characterized by means providing, while said valve means is disengaged from both of said valve seats, a restricted communication between the brake pipe and atmosphere for causing a quick service reduction of the pressure in the brake pipe.

6. The emergency valve device, as recited in claim 2, further characterized in that, while said valve means is in engagement with said second valve seat, said continual quick service valve device comprises:

(a) a first means providing a restricted communication through which fluid under pressure flows from the brake pipe to atmosphere, and (b) a second means providing said restricted communication through which fluid under pressure can flow from the quick action chamber to atmosphere.

7. For use in a brake apparatus including a brake pipe, an auxiliary reservoir, an emergency reservoir and a quick action chamber each normally charged to a certain chosen pressure, a brake cylinder and a fluid-pressure-operated service valve device, a fluid-pressure-operated emergency valve device operative in conjunction with said service valve device in response to a reduction of the pressure in the brake pipe at an emergency rate to effect the supply of fluid under pressure from said reservoirs to said brake cylinder to cause an emergency brake application, said emergency valve device comprising:

(a) a quick service volume chamber, (b) a continual quick service valve device operable jointly by the pressure in the quick action chamber and in the brake pipe in response to a continuing reduction of the pressure in the brake pipe at a service rate to effect repeated successive release of fluid under pressure from said quick service volume chamber to atmosphere and thereafter recharge of said quick service volume chamber from the brake pipe to the reduced pressure present in the brake pipe, (c) restricted means enabling flow of fluid under pressure between said quick service volume chamber and the quick action chamber to provide for charging the quick action chamber from said quick service volume chamber to the pressure in said quick service volume chamber, and (d) fluid-pressure-operated means operatively responsive to the release of fluid under pressure from said quick service volume chamber to atmosphere to so cooperate with said continual quick service valve device and said restricted means as to cause the release of fluid under pressure from the quick action chamber to atmosphere at a rate in excess of said service rate, whereby said continual quick service valve device is rendered sequentially operative to terminate the release of fluid under pressure from said quick service volume chamber to atmosphere and thereafter recharge said quick service volume chamber from the brake pipe to the reduced pressure therein, and said fluid-pressure-operated means is rendered sequentially operative in conjunction with said continual quick service valve device to terminate the release of fluid under pressure from the quick action chamber to atmosphere at said rate that is in excess of said service rate and thereafter effect the recharging of the quick action chamber from said quick service volume chamber to the reduced pressure in the brake pipe.

8. The emergency valve device, as recited in claim 1, further characterized in that said continual quick service valve device comprises:

(a) a valve,
(b) a stop,
(c) biasing means normally biasing said valve against said stop,
(d) a valve seat so arranged that when engaged by said valve as to close an unrestricted communication between the brake pipe and said quick service volume, and
(e) an abutment subject on one side to the pressure in the quick action chamber and on the other side to the pressure in the brake pipe and effective upon a reduction of brake pipe pressure on said other side to effect shifting of said valve into seating contact with said valve seat to close said unrestricted communication.

9. The emergency valve device, as recited in claim 1, further characterized in that said continual quick service valve device comprises:

(a) a hollow cylindrical member having a valve seat at each end thereof,
(b) a stop member,
(c) a first valve cooperating with one of said valve seats to control flow of fluid under pressure from the brake pipe to the interior of said hollow cylindrical member,
(d) a first biasing means normally biasing said first valve against said stop member,
(e) a second biasing means so interposed between said hollow cylindrical member and said stop member as to normally bias said first valve seat out of seating engagement with said first valve to establish a communication through which fluid under pressure may flow from the brake pipe to the interior of said hollow cylindrical member, (f) a second valve cooperating with the other of said valve seats to control flow of fluid under pressure from the interior of said hollow cylindrical member to said quick service volume chamber, (g) means providing a restricted communication through which fluid under pressure may flow from the interior of said hollow cylindrical member to said quick service volume chamber while said second valve is seated on said other valve seat, and (h) an abutment subject on one side to the pressure in the quick action chamber and on the other side to the pressure in the brake pipe and so arranged with respect to said second valve whereby a reduction of brake pipe pressure on said other side of said abutment renders said abutment effective to, first, seat said second valve on said other valve seat whereby flow of fluid under pressure from the brake pipe to said quick service volume chamber is only via said restricted bypass communication and thereafter shift said hollow cylindrical member to effect seating of said one valve seat on said first valve to terminate flow from the brake pipe to said quick service volume chamber.

10. The emergency valve device, as recited in claim 1, further characterized in that said continual quick service valve device is operative to control the supply of fluid under pressure from the brake pipe to said quick service volume chamber and the release of fluid under pressure from both said quick service volume chamber and the quick action chamber to atmosphere, said continual quick service valve device comprising:

(a) a hollow stop member having at one end an annular valve seat and intermediate its ends a port,
(b) two integral hollow cylindrical members of unequal diameter, the larger of which is provided at each end with a valve seating surface and the smaller of which is mounted for reciprocation in said hollow stop member and is provided at its outer end with a valve seat and intermediate its ends with an elongated peripheral annular groove that is of sufficient length so as to always communicate with said port as said cylindrical members reciprocate within said hollow stop member,
(c) a first valve cooperating with said valve seat at the outer end of said smaller cylindrical member to control flow of fluid under pressure from the brake pipe to the interior of said two hollow cylindrical members,
(d) a first biasing means normally biasing said first valve against the other end of said stop member,
(e) a stationary annular exhaust valve seat,
(f) a second biasing means so interposed between the cylindrical member of larger diameter and said stop member as to normally bias said valve seat at the outer end of said smaller cylindrical member out of seating engagement with said first valve to establish a communication through which fluid under pressure may flow from the brake pipe to the interior of said two hollow cylindrical members, the seating surface at one end of said larger cylindrical member out of seating engagement with said valve seat at said one end of said stop member to establish a communication through which fluid under pressure may be released from the quick action chamber to atmosphere upon operation of said fluid-pressure-operated means in response to the release of fluid under pressure from said quick service volume chamber to atmosphere, and the seating surface at the other end of said larger cylindrical member into seating engagement with said stationary exhaust valve seat to close communication between said quick service volume chamber and atmosphere, (g) a second valve cooperating with said seating surface at the other end of said larger cylindrical member to control flow of fluid under pressure from the interior of said hollow cylindrical members to said quick service volume chamber, (h) means providing a restricted bypass communication through which fluid under pressure may flow from the interior of said hollow cylindrical members to said quick service volume chamber while said second valve is seated on said seating surface at the other end of said larger cylindrical member, and (i) an abutment subject on one side to the pressure in the quick action chamber and on the other side to the pressure in the brake pipe and so arranged with respect to said valves whereby a reduction of brake pipe pressure at a service rate on said other side of said abutment renders said abutment effective to, first, seat said second valve on said seating surface at the other end of said larger cylindrical member whereby flow of fluid under pressure from the interior of said hollow cylindrical member to said quick service volume chamber is only via said restricted bypass communication, and thereafter shift said hollow cylindrical member to a position in which said seating surface at the other end of said larger cylindrical member is unseated from said stationary exhaust valve seat whereupon fluid under pressure can flow from both the brake pipe and the quick service volume chamber to atmosphere, and said seating surface at the one end of said larger cylindrical member is unseated from said valve seat at one end of said hollow stop member whereby fluid under pressure can flow from the quick action chamber to atmosphere via said port, said groove and past said valve seat upon operation of said fluid-pressure-operated means.

11. The emergency valve device, as recited in claim 9, further characterized in that said means providing a restricted communication through which fluid under pressure may flow from the interior of said hollow cylindrical member to said quick service volume chamber, while said second valve is seated on said other valve seat, is carried by said second valve.

12. The emergency valve device, as recited in claim 9, further characterized in that said means providing a restricted communication through which fluid under pressure may flow from the interior of said hollow cylindrical member to said quick service volume chamber is carried within said hollow cylindrical member and constitutes the sole communication through which fluid under pressure may flow to said quick service volume chamber.

13. The emergency valve device, as recited in claim 10, further characterized by a casing member having a first bore at one end of which is formed said stationary annular exhaust valve seat, and a second bore coaxial with said first bore, said second bore having said hollow stop member so disposed therein that said annular valve seat at one end thereof is so spaced apart from said stationary annular exhaust valve seat as to enable the larger of said hollow cylindrical members to be disposed between said valve seats so as to be movable from a position in which it engages neither valve seat to a position in which it engages either of said valve seats, said first valve being so constructed as to be also mounted in said second bore in such a position as to be normally biased by said first biasing means against said other end of said stop member and movable away from said other end subsequent to shifting of said valve seat at the outer end of said smaller cylindrical member into engagement with said first valve.

14. The emergency valve device, as recited in claim 10, further characterized in that said abutment carries thereon said restricted means enabling flow of fluid under pressure from the brake pipe to the quick action chamber to provide for charging the quick action chamber.

15. The emergency valve device, as recited in claim 1, further characterized in that said restricted means comprises a pair of chokes so arranged as to provide for the flow therethrough in series of fluid under pressure from said quick service volume chamber to the quick action chamber, one of said pair of chokes being so arranged and of such size as to provide for the release of fluid under pressure from the quick action chamber to atmosphere at said rate in excess of said service rate independently of the other of said pair of chokes.

16. The emergency valve device, as recited in claim 15, further characterized in that the diameter of said one choke is greater than the diameter of the other of said pair of chokes.

17. The emergency valve device, as recited in claim 15, further characterized in that the diameter of said one choke is 0.0760 inch, and the diameter of the other of said pair of chokes is 0.0210 inch.

18. The emergency valve device, as recited in claim 1, further characterized in that said fluid-pressure-operated means comprises:

(a) an annular valve seat, and (b) a diaphragm-type valve subject on one side to the pressure of fluid in said quick service volume chamber to bias the other side into seated engagement with said annular valve seat whereby said diaphragm-type valve, while in seated engagement with said annular valve seat, closes communication between the quick action chamber and atmosphere, and said restricted means comprises a pair of chokes so arranged and of such size as to enable the release of fluid under pressure from the quick action chamber through said pair of chokes in parallel to atmosphere at a rate in excess of said service rate in response to the release of fluid under pressure from said quick service volume chamber to atmosphere by operation of said quick service valve device.

19. The emergency valve device, as recited in claim 1, further characterized in that said fluid-pressure-operated means comprises:

(a) an annular valve seat, and (b) a diaphragm-type valve subject on one side to the pressure of fluid in said quick service volume chamber to bias the opposite side into seated engagement with said annular valve seat whereby said diaphragm-type valve, while in seated engagement with said annular valve seat, closes communication between the quick action chamber and atmosphere, and said restricted means comprises a pair of chokes, one of which is carried by said diaphragm-type valve and so arranged as to enable flow of fluid under pressure therethrough in series with the other of said pair of chokes from said quick service volume chamber to the quick action chamber while said diaphragm-type valve is biased into seated engagement with said valve seat, and the other of said chokes being of such size and so arranged as to provide for the release of fluid under pressure from the quick action chamber to atmosphere past said valve seat at a rate in excess of said service rate independently of said one choke upon unseating of said diaphragm-type valve from said valve seat in response to the release of fluid under pressure from said quick service volume chamber to atmosphere by operation of said continual quick service valve device.

20. The emergency valve device, as recited in claim 15, further characterized in that said fluid-pressure-operated means comprises a diaphragm-type valve, and the other of said pair of chokes is mounted on said diaphragm-type valve to provide a restricted communication between one side thereof and the other to provide for the charging of the quick action chamber from said quick service volume chamber.

21. The emergency valve device, as recited in claim 1, further characterized in that said emergency valve device further comprises:
    (a) a fluid-pressure-operated brake pipe vent valve means operable upon the release of fluid under pressure to cause the release of fluid under pressure from the brake pipe to atmosphere at an emergency rate,
    (b) valve means for effecting the release of fluid under pressure from said fluid-pressure-operated brake pipe vent valve means to cause the operation thereof, and
    (c) abutment means disposed in said quick service volume chamber and operable by said fluid-pressure-operated means only in response to an emergency rate of reduction of pressure in the brake pipe to operate said valve means to effect the release of fluid under pressure from said fluid-pressure-operated brake pipe vent valve means.

22. The emergency valve device, as recited in claim 21, further characterized in that said fluid-pressure-operated brake pipe vent valve means comprises:
    (a) an annular valve seat the area within which is open to atmosphere, and
    (b) an abutment having a chamber on each side thereof subject to the pressure in the brake pipe, said abutment being so arranged as to engage said valve seat so long as equal pressures are present in each of said chambers and movable out of engagement with said seat to release fluid under pressure from the chamber on the side thereof adjacent said seat to atmosphere at an emergency rate in response to the release of fluid under pressure from the other of said chambers by operation of said valve means.

23. The emergency valve device, as recited in claim 21, further characterized in that said valve means comprises:
    (a) an annular valve seat the area within which is open to said quick service volume chamber and the area without which is open to said fluid-pressure-operated brake pipe vent valve means,
    (b) a valve cooperating with said valve seat and having a fluted stem extending in the direction of said abutment means, and
    (c) biasing means normally biasing said valve into seating engagement with said valve seat,
    (d) the operation of said abutment means by said fluid-pressure-operated means being effective to cause said fluted stem to unseat said valve from said valve seat to release fluid under pressure from said fluid-pressure-operated brake pipe vent valve means to cause operation thereof.

24. The emergency valve device, as recited in claim 1, further characteried in that said emergency valve device further comprises:
    (a) valve means for effecting the flow of fluid under pressure from the emergency reservoir to the brake cylinder, and
    (b) abutment means disposed in said quick service volume chamber and operable by said fluid-pressure-operated means only in response to an emergency rate of reduction of pressure in the brake pipe to operate said valve means to effect the flow of fluid under pressure from the emergency reservoir to the brake cylinder.

25. The emergency valve device, as recited in claim 1, further characterized in that said emergency valve device further comprises:
    (a) a fluid-pressure-operated brake pipe vent valve means operable upon the release of fluid under pressure therefrom to cause the release of fluid under pressure from the brake pipe to atmosphere at an emergency rate,
    (b) a first valve means for effecting the release of fluid under pressure from said fluid-pressure-operated brake pipe vent valve means to cause the operation thereof,
    (c) a second valve means for effecting the flow of fluid under pressure from the emergency reservoir to the brake cylinder, and
    (d) an abutment subject on one side to the pressure in the quick action chamber and one the other side to the pressure in the brake pipe and operable in response to a reduction of the pressure in the brake pipe at only an emergency rate to cause simultaneous operation of said first and second valve means.

26. The emergency valve device, as recited in claim 1, further characterized in that said emergency valve device further comprises:
    (a) an annular valve seat the area within which is open to the emergency reservoir and the area without which is open to the brake cylinder,
    (b) a valve cooperating with said valve seat and having an operating stem extending from one side thereof through said annular valve seat,
    (c) abutment means subject on one side to the pressure in the quick action chamber and on the other side to the pressure in the brake pipe and so disposed with respect to said continual quick service valve device and said operating stem whereby said abutment means is responsive to a reduction of pressure in the brake pipe at a service rate to operate said continual quick service valve device without effecting operation of said valve via said operating stem, and said abutment means is responsive to a reduction of pressure in the brake pipe at only an emergency rate to effect via said valve stem unseating of said valve from said valve seat to cause flow of fluid under pressure from the emergency reservoir to the brake cylinder.

27. The emergency valve device, as recited in claim 24, further characterized in that said valve means comprises:

(a) an annular valve seat the area within which is open to the brake cylinder and the area without which is open to the emergency reservoir, (b) a valve cooperating with said valve seat and having a fluted stem extending in the direction of said abutment means, (c) sealing means carried by said fluted stem and providing a seal between said quick service volume chamber and the brake cylinder, and (d) biasing means normally biasing said valve into seating engagement with said valve seat to close communication between the emergency reservoir and the brake cylinder, (e) the operation of said abutment means by said fluid-pressure-operated means being effective to cause said fluted stem to unseat said valve from said valve seat to cause flow of fluid under pressure from the emergency reservoir to the brake cylinder until equalization therebetween occurs.

28. The emergency valve device, as recited in claim 1, further characterized by a brake-cylinder-pressure-operated inshot valve device comprising:

(a) two parallel flow communications through which fluid under pressure is supplied from the auxiliary reservoir and the emergency reservoir to the brake cylinder, (b) a first valve means for controlling flow of fluid under pressure through one of said two parallel flow communications, (c) a first biasing means for operating said first valve means to cut off flow through said one communication, (d) an abutment operable in response to the supply of fluid under pressure to one side thereof to operate said first valve means against the yielding resistance of said biasing means to establish said one communication and subject on the other side to the pressure of the fluid supplied to the brake cylinder, and (e) brake-pipe-pressure-operated valve means for controlling the flow of fluid under pressure to said one side of said abutment whereby said abutment in response to the flow of fluid under pressure to said one side operates said first valve means to effect the flow of fluid under pressure through said one of said two communications so long as fluid under pressure is supplied to said one side of said abutment, said brake-pipe-pressure-operated valve means being effective in response to the release of all fluid under pressure therefrom to trap fluid at a chosen pressure on said one side of said abutment whereby said abutment, in response to brake cylinder pressure on said other side exceeding said chosen pressure, renders said biasing means effective to operate said first valve means to cut off flow through said one communication, so that further flow of fluid under pressure to the brake cylinder is only via the other of said two parallel flow communications thereby providing a two-stage buildup of pressure in the brake cylinder.

29. The emergency valve device, as recited in claim 1, further characterized by an inshot valve device comprising:

(a) two parallel flow communications through which fluid under pressure is supplied from the auxiliary reservoir and the emergency reservoir to the brake cylinder, (b) a first valve means for controlling flow of fluid under pressure through one of said two communications, (c) a first biasing means for operating said first valve means to cut off flow through said one communication, (d) a first abutment subject on one side to the fluid under pressure supplied to the brake cylinder, (e) a second biasing means so disposed on the other side of said first abutment as to operate said valve means against the yielding resistance of said first biasing means as to establish said one communication, (f) a second valve means for controlling the flow of fluid under pressure from the brake cylinder to said other side of said first abutment whereby, only while both sides of said first abutment are subject to the fluid under pressure in the brake cylinder, said second biasing means is rendered effective to operate said valve means to establish said one communication, and (g) means operable only in response to an emergency rate of reduction in the brake pipe pressure to cause said second valve means to cut off flow of fluid under pressure from the brake cylinder to said other side of said first abutment whereby only said one side of said first abutment is subject to brake cylinder pressure thereby enabling said first biasing means to operate said first valve means to cut off flow through said one communication upon brake cylinder pressure establishing on said one side of said first abutment a fluid pressure force in excess of the force exerted on said other side of said abutment by second biasing means, so that further flow of fluid under pressure to the brake cylinder is only via the other of said two parallel flow communications thereby providing a two-stage buildup of pressure in the brake cylinder.

30. The emergency valve device, as recited in claim 28, further characterized by means for restricting the flow of fluid under pressure through the other of said two parallel flow communications in said inhot valve device.

31. The emergency valve device, as recited in claim 28, further characterized in that said first valve means comprises:

(a) a valve seat, and (b) a disc valve biased in the direction of said valve seat by said biasing means.

32. The emergency valve device, as recited in claim 28, further characterized in that said brake-pipe-pressure-operated valve means comprises:

(a) a conduit through which fluid under pressure supplied to the brake cylinder may flow to said one side of said abutment, (b) an annular valve seat to the inner area of which fluid under pressure is supplied via said conduit, (c) a valve cooperable with said seat to control flow of fluid under pressure from the brake cylinder to said one side of said abutment, and (d) a second abutment operably connected to said valve and effective to unseat said valve from said valve seat in response to the supply of fluid under pressure from the brake pipe to said second abutment, (e) said valve, valve seat and second abutment being so arranged with respect to said first abutment as to enable said first abutment to effect seating of said valve on said valve seat in response to the buildup of brake cylinder pressure on said other side of said first abutment only in the absence of the supply of fluid under pressure from the brake pipe to said second abutment whereby further flow of fluid under pressure to the brake cylinder is only via the other of said two parallel flow communications thereby providing a two-stage buildup of pressure in the brake cylinder.

33. The emergency valve device, as recited in claim 28, further characterized in that said brake-pipe-pressure-operated valve means comprises:
   (a) a conduit through which fluid under pressure may be supplied from the brake pipe to said one side of said abutment,
   (b) a stop member,
   (c) a first hollow cylindrical member having a stop at one end and an out-turned flange at the other end,
   (d) a second biasing means for normally biasing said out-turned flange at the other end of said first hollow cylindrical member against said stop member,
   (e) a second hollow cylindrical member longer than said first cylindrical member in which it is slidably and sealably mounted and having a valve seat at one end and an out-turned flange at the other end,
   (f) a third biasing means for normally biasing said second mentioned out-turned flange into abutting relationship with said first mentioned out-turned flange whereby said valve seat at said one end of said second hollow cylindrical member protrudes beyond said stop at said one end of said first hollow cylindrical member, and
   (g) a valve so carried on said one side of said abutment as to normally be disengaged from both of said valve seats whereby fluid under pressure supplied from the brake pipe to said conduit flows via said second hollow cylindrical member to said one side of said abutment,
   (h) said first and second biasing means being of such strength that said valve is moved into engagement with said stop at said one end of said first hollow cylindrical member only in response to a reduction of the pressure in the brake pipe to a value that is a chosen amount less than that required to effect a full service brake application whereby brake pipe pressure at said reduced value is trapped on said one side of said abutment to provide a fluid pressure force on said one side of said abutment of sufficient magnitude to prevent the brake cylinder pressure acting on said other side from deflecting said abutment in the direction to render said first biasing means effective to operate said valve means to cut off flow of fluid under pressure through said one communication.

34. The emergency valve device, as recited in claim 29, further characterized in that said second valve means comprises:
   (a) a pair of spaced-apart annular valve seats,
   (b) a diaphragm-type valve disposed between said seats and shiftable into engagement with each of said annular valve seats to, while in engagement with each respective seat, form within the respective seat a first chamber and without said respective seat a second chamber,
   (c) biasing means normally biasing one side of said diaphragm-type valve into contact with one of said pair of annular valve seats,
   (d) a first conduit means through which fluid under pressure is supplied from the brake cylinder to the first chamber within said one valve seat and the second chamber without the other of said pair of valve seats,
   (e) choke means so disposed in said first conduit as to restrict the flow of fluid under pressure from the brake cylinder to said second chamber without said other valve seat without restricting flow to said first chamber within said one valve seat, and
   (f) a second conduit means through which said means operably only in response to an emergency rate of reduction in brake pipe pressure supplies fluid under pressure to said second chamber without said one valve seat whereby said diaphragm-type valve is shifted against the yielding resistance of said biasing means out of contact with said one annular valve seat and into contact with the other of said pair of annular valve seats to cut off flow of fluid under pressure to said other side of said first abutment only in response to the operation of said means to supply fluid under pressure to said second conduit.

35. The emergency valve device, as recited in claim 3, further characterized in that said valve means comprises:
   (a) an annular valve seat disposed in concentric relation to said continual quick service valve device,
   (b) an annular valve member disposed in concentric relation to said continual quick service valve device and having an annular valve formed on one end for engaging said annular valve seat,
   (c) a spring seat,
   (d) a spring interposed between said spring seat and said annular valve member for normally biasing said annular valve at the one end of said valve member into engagement with said annular valve seat, and
   (e) a lost-motion connection between said annular valve member and said continual quick service valve device so constructed and arranged that said annular valve at the one end of said valve member is unseated from said annular valve seat by operation of said continual quick service valve device only upon the supply of fluid under pressure from the brake pipe to said continual quick service valve device subsequent to the release of all fluid under pressure from the quick action chamber as the result of effecting an emergency brake application.

36. The emergency valve device, as recited in claim 1, further characterized in that said emergency valve device further comprises:
   (a) a movable abutment subject on one side to the pressure in the quick action chamber and on the other side to the pressure in the brake pipe,
   (b) a check valve device providing flow of fluid under pressure in the direction from the brake cylinder to the brake pipe,
   (c) valve means so arranged with respect to said abutment, said check valve device and said continual quick service valve device as to be operable by said abutment in response to the supply of fluid under pressure to the brake pipe in the absence of fluid under pressure in the quick action chamber to effect flow of fluid under pressure from said check valve device to the brake pipe whereby fluid under pressure in the brake cylinder flows to the brake pipe until equalization of pressure between the brake cylinder and the brake pipe occurs, said abutment being effective in response to a reduction of the pressure in the brake pipe at a service rate to cause said continual quick service valve device to repeatedly release fluid under pressure from said quick service volume chamber to atmosphere and thereafter recharging said volume chamber from the brake pipe.

* * * * *